United States Patent
Adler et al.

(10) Patent No.: US 10,451,743 B2
(45) Date of Patent: Oct. 22, 2019

(54) INTEGRATED INTERFACE ARCHITECTURE AND CONTROL LOGIC FOR ENHANCED EMERGENCY LOCATION FUNCTIONALITY

(71) Applicant: The Boeing Company, Chicago, IL (US)

(72) Inventors: Charles O. Adler, Bellevue, WA (US); Timothy A. Murphy, Everett, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 739 days.

(21) Appl. No.: 15/054,000

(22) Filed: Feb. 25, 2016

(65) Prior Publication Data
US 2017/0248701 A1    Aug. 31, 2017

(51) Int. Cl.
*G01S 19/17*    (2010.01)
*B64D 45/00*    (2006.01)
*G01S 5/02*    (2010.01)

(52) U.S. Cl.
CPC .............. *G01S 19/17* (2013.01); *B64D 45/00* (2013.01); *B64D 45/0015* (2013.01); *G01S 5/0231* (2013.01); *B64D 2045/0065* (2013.01)

(58) Field of Classification Search
CPC ........ B64D 45/00; G01S 19/17; G01S 5/0231
See application file for complete search history.

(56) References Cited

U.S. PATENT DOCUMENTS

| 5,367,306 | A | 11/1994 | Hollon et al. |
| 6,208,269 | B1 | 3/2001 | Brodie et al. |
| 6,992,623 | B2 | 1/2006 | Street |
| 8,687,375 | B2 | 4/2014 | Uy et al. |
| 8,727,263 | B2 | 5/2014 | Fabre et al. |
| 9,193,478 | B2 | 11/2015 | Girod et al. |
| 10,002,519 | B2 | 6/2018 | Bekanic |
| 2010/0194622 | A1 | 8/2010 | Clingman et al. |
| 2011/0194629 | A1 | 8/2011 | Bekanic |
| 2013/0070556 | A1 | 3/2013 | Huskamp et al. |
| 2016/0176538 | A1 | 6/2016 | Bekanic |
| 2017/0106997 | A1 | 4/2017 | Bekanic |
| 2017/0155763 | A1 | 6/2017 | Bekanic |

(Continued)

OTHER PUBLICATIONS

U.S. Appl. No. 61/337,731, filed Feb. 9, 2010.
(Continued)

*Primary Examiner* — Jerrah Edwards
(74) *Attorney, Agent, or Firm* — Ostrager Chong Flaherty & Broitman P.C.

(57) ABSTRACT

Aircraft tracking and emergency location avionics architectures that integrate existing fixed Emergency Locator Transmitter (ELT) installations, their associated aircraft avionics systems and existing flight deck interfaces with an Autonomous Distress Tracker (ADT) transceiver unit in a coupled configuration. Some of the architectures allow the ADT unit and its advanced distress detecting and reporting capabilities to monitor the activation control path for the ELT and the associated ELT activation outputs. Other architectures place the ADT unit and its advanced distress detection capabilities and ground-controlled capabilities in the activation control path for the ELT. Additional architectures entail the connection of an ADT unit to an ELT remote panel on the flight deck of an aircraft.

19 Claims, 26 Drawing Sheets

(56) References Cited

U.S. PATENT DOCUMENTS

2018/0240324 A1 8/2018 Bekanic
2018/0247519 A1 8/2018 Bekanic

OTHER PUBLICATIONS

U.S. Appl. No. 61/339,863, filed Mar. 10, 2010.
U.S. Appl. No. 61/632,883, filed Feb. 1, 2012.
U.S. Appl. No. 13/694,660, filed Dec. 26, 2012.

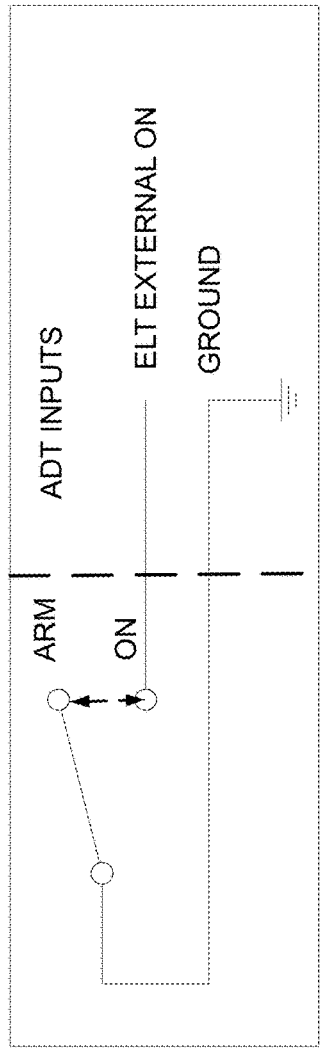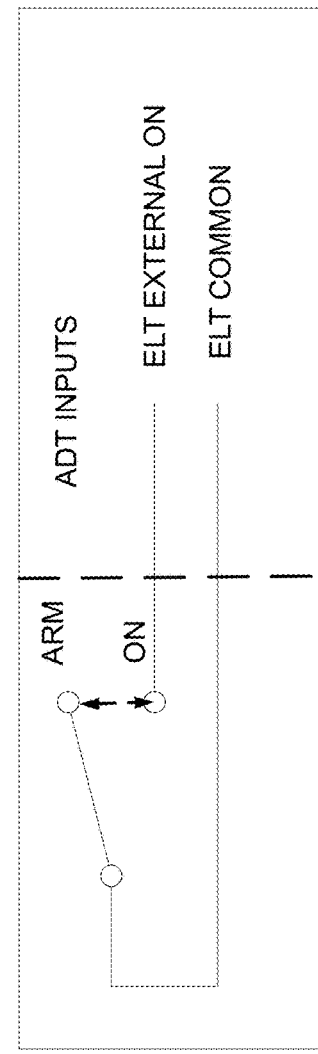
FIG. 17A
FIG. 17B

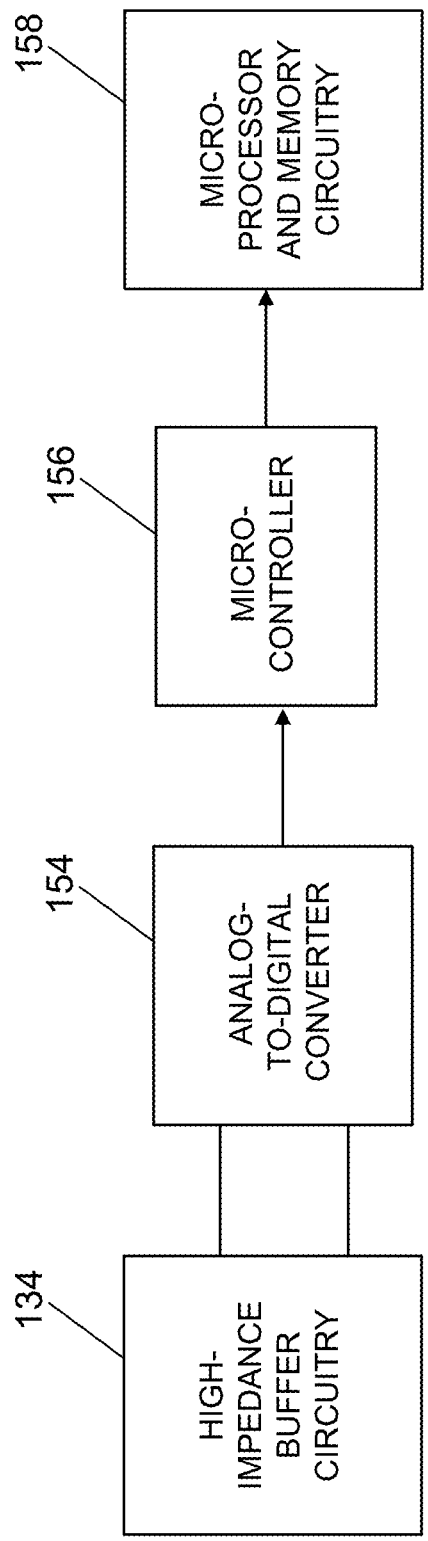

INTEGRATED INTERFACE ARCHITECTURE AND CONTROL LOGIC FOR ENHANCED EMERGENCY LOCATION FUNCTIONALITY

BACKGROUND

The technology disclosed herein generally relates to systems and methods for detecting and locating an aircraft in distress. More particularly, the technology disclosed herein relates to integrated aircraft distress system architectures capable of providing emergency location functionality.

Most commercial airliners are equipped with fixed Emergency Locator Transmitters (ELTs) that broadcast beacons and satellite uplinks in the case of an emergency to enable search and rescue crews to find the aircraft. In some recent aircraft emergencies, however, the ELTs were not activated. Such incidents have shown the importance of providing a more reliable and tamperproof method to provide an accurate and timely aircraft location tracking, including the highly accurate tracking of an aircraft in a distress condition. Autonomous Distress Trackers (ADTs) are an emerging class of aircraft systems that support this need.

Based on the current methods of installing normal (non-distress, non-tamper-proof) tracking systems, ADTs for aircraft will typically be installed as stand-alone installations, e.g., there is the existing fixed ELT installation and a separate stand-alone ADT installation installed by itself or in addition to the existing ELT installation.

These separate installation approaches have a number of drawbacks; including new flight deck hardware to support the crew interfaces to the ADT, no improvements to the current ELT performance limitations, and two uncoupled emergency systems that require separate crew actions and potentially unsynchronized activation that may result in less effective emergency notifications and ambiguous signals to the emergency responders. Integrating these installations is a significant challenge due to the wide range of existing ELT manufacturers and interfaces and the range of flight deck and avionics interfaces potentially involved.

The foregoing shortcomings can be addressed by providing a system and a method that maximizes emergency or aircraft-in-distress location capabilities. To facilitate early and wide adoption, the aircraft-in-distress location tracking system should be designed to facilitate simplified and low-cost aircraft integration and installation.

SUMMARY

The subject matter disclosed in detail below includes multiple integrated ADT-ELT architecture configurations that address one or more of the above-described shortcomings—by reusing existing crew interfaces to reduce installation costs, crew training and crew workload in an emergency, by providing multiple options to synchronize the emergency broadcasts by ADT and ELTs, and by providing an option to significantly improve existing fixed ELT emergency performance and hence the emergency performance of the overall system. These integrated ADT-ELT architecture configuration options are enabled by an innovative common ADT interface architecture that supports a wide range of existing ELT and flight deck interfaces and multiple means of integrating ADT and ELTs depending on the degree of coupling desired by an airline or allowed by regulatory authorities. (As used herein, the term "common" means belonging to or shared by two or more components, not occurring or appearing frequently.)

More specifically, the aircraft tracking and emergency location avionics architectures disclosed herein integrate existing fixed ELT installations, their associated aircraft avionics systems and existing flight deck interfaces with an ADT unit in a coupled configuration. Some of the architectures allow the ADT unit and its advanced distress detecting and reporting capabilities to monitor the activation control path for the ELT and the associated ELT activation outputs (referred to herein as "loosely coupled configurations"). Other architectures place the ADT unit and its advanced distress detection capabilities and ground-controlled capabilities in the activation control path for the ELT (referred to herein as "medium coupled" or "tightly coupled" configurations). Additional architectures entail the connection of a stand-alone ADT unit to an ELT remote panel on the flight deck of an aircraft and/or an "ELT ON" discrete input in the aircraft avionics.

The loosely coupled (or "parallel"), medium coupled (or "enhanced parallel") and tightly coupled (or "series") integrated ADT-ELT configurations provide multiple improvements over non-integrated configurations, including reusing existing crew interfaces to reduce installation costs, crew training and crew workload in an emergency, and providing for the synchronization of emergency broadcasts by ADT and ELTs. The loosely coupled configuration further provides enhanced aircraft state awareness to the ADT and associated ground systems and hence improves the emergency performance of the overall system. The medium and tightly coupled configurations significantly improve existing fixed ELT emergency performance and hence the emergency performance of the overall system. This significant performance improvement is achieved by allowing the ADT to trigger ELT distress broadcasts, using, for example, ADT internal trigger conditions indicating aircraft non-normal or distress flight conditions or ground segment commands uplinked from an airline operation center. The medium and tightly coupled configurations may also support improved emergency reporting in the presence of SATCOM network congestion or RF interference scenarios. The tightly coupled configuration provides the opportunity to filter flight crew inputs to the ELT, resulting in potentially reduced false alarms. The medium coupling configuration does not support the filtering function, but may provide a more straightforward certification.

The above-described configuration options are enabled by unique ADT architecture features that support multiple means of interfacing the ADT to a broad range of existing fixed ELTs and their aircraft interfaces. This ADT interface architecture supports these multiple integration and installation options, including a minimum impact "parallel" ADT-ELT installation option, "series" and "enhanced parallel" ADT-ELT installation approaches that significantly enhance the capabilities of the existing ELTs, and potentially a "stand-alone" ADT installation that allows the deletion of the fixed ELTs currently installed on many aircrafts with minimal impacts on the existing aircraft system interfaces and aircraft operations.

The above-described configuration options may provide significant advantages for emergency location and aircraft distress tracking performance combined with lower installation, integration and training costs compared to some non-integrated or stand-alone architectures.

One aspect of the subject matter disclosed in detail below is an ADT unit comprising: first processing means comprising ELT activation logic; and an input interface comprising first, second and third terminals and second processing means configured to output an ELT ON state signal to the ELT activation logic if an impedance between the first and third terminals is effectively zero or if an impedance between the first and second terminals is effectively zero. In accordance with some embodiments, the first and second processing means comprise a common processor. In accordance with some embodiments, the first processing means comprise a first processor and the second processing means comprises a second processor. The input interface may further comprise a high-impedance buffer circuit connected to the first, second and third terminals, and an analog-to-digital converter disposed between the high-impedance buffer circuit and the second processing means.

In some embodiments of the ADT unit described in the preceding paragraph, the first processing means further comprises an aircraft behavior state estimator and ADT trigger logic that receives an estimated aircraft behavior state signal from the aircraft behavior state estimator and the ELT ON state signal from the second processing means, and is configured to send an ELT activation request signal to the ELT activation logic if the estimated aircraft behavior state signal indicates an abnormal or distress state or an ELT ON state signal has been received.

Another aspect of the subject matter disclosed in detail below is a system onboard an aircraft comprising: an ELT remote panel on the flight deck of the aircraft, the ELT remote panel comprising a switch; a first antenna that is attached to an exterior of a fuselage skin of the aircraft; and an ADT unit connected to the first antenna and comprising: first processing means comprising ELT activation logic; and a first input interface comprising first, second and third terminals, and second processing means configured to output an ELT ON state signal to the ELT activation logic if an impedance between the first and third terminals is effectively zero or if an impedance between the first and second terminals is effectively zero, wherein the switch of the ELT remote panel is connected to the first terminal of the first input interface by wiring. When the ELT remote panel switch has a first switch configuration, the switch is not connected to either of the second and third terminals of the first input interface and the third terminal of the first input interface is connected to ground. When the ELT remote panel switch has a second switch configuration different than the first switch configuration, the switch is also connected to the second terminal of the first input interface by wiring and the third terminal of the first input interface is connected to ground.

The system described in the preceding paragraph may further comprise: a second antenna that is attached to an exterior of a fuselage skin of the aircraft; and an ELT unit connected to the second antenna and to the ADT unit, in which case the ELT unit can also be connected to the switch of the ELT remote panel.

The ADT unit may further comprise a first output interface that comprises a terminal connected to the ELT unit and third processing means configured to output an ELT ON state signal to the terminal of the first output interface in response to receipt of an ELT ON state signal from the ELT activation logic. In some embodiments, the ELT activation logic comprises trigger activation filtering logic and trigger activation input pass-through logic configured to apply the ELT ON state signal to the terminal of the first output interface subject to the trigger activation filtering logic.

In accordance with some embodiments of the above-described system, the first processing means further comprises an aircraft behavior state estimator and trigger logic that receives an estimated aircraft behavior state signal from the aircraft behavior state estimator and the ELT ON state signal from the second processing means, the trigger logic being configured to send an ELT activation request signal to the ELT activation logic if the estimated aircraft behavior state signal indicates an abnormal or distress state or an ELT ON state signal has been received. In this case, the ELT activation logic comprises crew activation filtering logic and crew activation input pass-through logic configured to apply the ELT ON state signal from the second processing means to the terminal of the first output interface subject to the crew activation filtering logic.

The system may further comprise an aircraft avionics system, wherein the ADT unit further comprises a second input interface and a second output interface connected to the aircraft avionics system by wiring.

A further aspect of the subject matter disclosed in detail below is a method for equipping first and second aircraft with first and second ADT units of identical design having first, second and third terminals, wherein the first aircraft has a flight deck equipped with a first ELT remote panel switch having a first switch configuration and the second aircraft has a flight deck equipped with a second ELT remote panel switch having a second switch configuration different than the first switch configuration, the method comprising: connecting the first and second terminals of the first ADT unit to the first ELT remote panel switch by wiring; connecting the first terminal of the second ADT unit to the second ELT remote panel switch by wiring; and connecting the third terminal of the second ADT unit to ground. This method may further comprise: connecting a fourth terminal of the first ADT unit by wiring to a first ELT unit onboard the first aircraft; and connecting a fourth terminal of the second ADT unit by wiring to a second ELT unit onboard the second aircraft.

Other aspects of systems and methods for location tracking of aircraft in distress are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIGS. 17A and 17B are diagrams depicting the internal wiring of the flight deck panel switch in accordance with respective ELT remote panel switch configurations.

FIG. 20 is a block diagram showing some hardware components of the ADT unit, including interface circuitry and a microprocessor that executes one or more of the interface sensor functions identified in FIGS. 17C, 18 and 19C.

In FIGS. 1, 4 and 6-12, the following symbology has been adopted: any line connecting two components and having no arrowhead represents aircraft wiring for carrying RF electrical signals (e.g., RF coaxial cable); any line connecting two components and having at least one arrowhead represents aircraft wiring for power or data; any dashed arrow represents an RF signal path; and any zigzag-shaped arrow represents RF signals propagating through the atmosphere.

Reference will hereinafter be made to the drawings in which similar elements in different drawings bear the same reference numerals.

DETAILED DESCRIPTION

Figure 1:
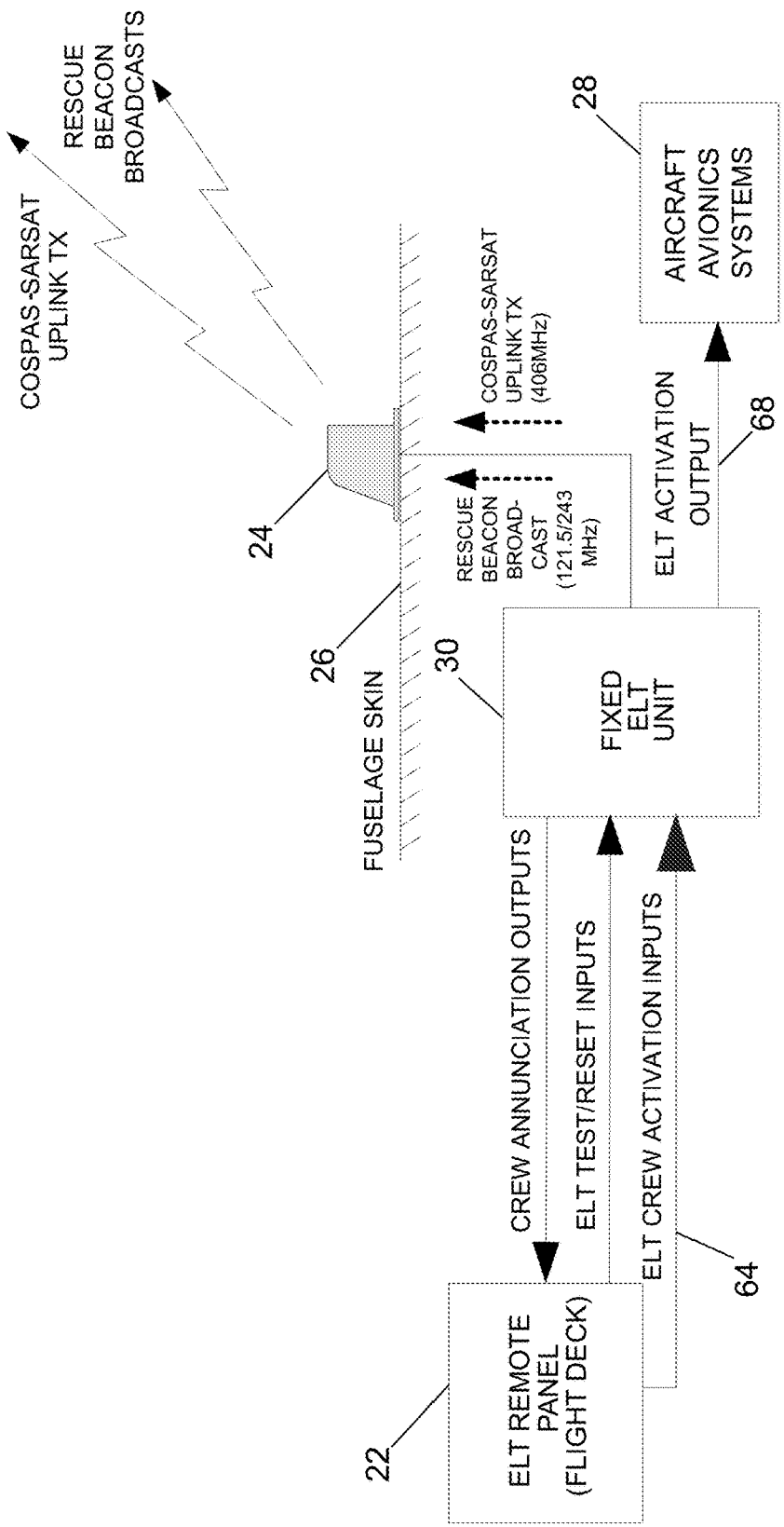
FIG. 1 is a diagram showing a typical stand-alone ELT architecture.

Illustrative embodiments of an aircraft-in-distress location tracking system are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The embodiments disclosed below utilize existing aircraft information systems and existing aircraft power systems. These existing aircraft systems will vary in their specifics depending on the aircraft model and avionics architectures used. For the purposes of the current disclosure, virtually all will support the interfaces described, although the specific location/sourcing unit may vary.

The existing fixed ELT system (that is being replaced or integrated within the configurations disclosed below) comprises an ELT, of which there are multiple variations from multiple manufacturers. The interfaces described in this disclosure are common across those used by many (probably most or all) commercial airliners. The existing fixed ELT system further comprises an externally mounted ELT antenna and a flight deck-mounted ELT switch. This switch can vary by aircraft and ELT model. The interface architecture described herein enables the various integrated or stand-alone architectures by supporting the ELT switch interfaces for many (probably most or all) commercial airliners and ELTs.

The ADT system components depicted in the drawings comprise an ADT unit, which hosts most of the ADT system functionality, and an externally mounted ADT antenna. Another potential ADT system component is an ADT-specific flight deck control panel. The architectures disclosed below support this option, but they also support re-use or shared use of the existing ELT flight deck switches to reduce installation costs, enhance operational awareness and reduce training and documentation costs.

The ELTs as currently implemented on aircraft have many important features, including direct crew activation panels, aircraft identification information for transmissions, locator beacons that rescue aircraft or ground rescuers can use to locate a crash site, and the ability to uplink satellite transmissions to the international worldwide coverage COSPAS/SARSAT. COSPAS/SARSAT is a search and rescue satellite system that allows location of persons in distress by means of the signals received via the space elements (including the inclusion of aircraft location in the satellite uplink for newer systems). The system serves a wide variety of users including those on ships, aircraft and travelers in remote regions.

ELTs are fairly broadly used within the airline industry with some models of wide-body aircraft approaching 100% equipage with ELTs. There are many models and manufacturers of ELTs, all built to common standards but with varying flight deck interfaces and concepts of operations. A typical stand-alone ELT installation is shown in FIG. 1. This installation comprises a fixed ELT unit 30, an ELT antenna 24 mounted on an external surface of a fuselage skin 26, and an ELT remote panel 22 on the flight deck, which remote panel comprises the aforementioned ELT switch which can be manually operated by a member of the flight crew. The main transmitter control switch is labeled "ON"—"ARM". The switch is in the armed position for normal operations. The ELT remote panel 22 also has input means for sending ELT test/reset inputs to the ELT unit 30 and means for annunciating the state of the ELT unit 30 in response to crew annunciation outputs received from the ELT unit 30. The ELT unit 30 can be triggered by ELT activation inputs 64 from the ELT remote panel 22 and/or activation inputs from sensors (not shown in FIG. 1, but see FIG. 2) internal to the ELT unit 30 that detect the impact force produced during a crash. In response to a trigger event, the ELT unit 30 outputs electrical signals to the ELT antenna 24, which cause the latter to broadcast a 406-MHz rescue beacon to the COSPAS/SARSAT rescue satellite system. The rescue beacon transmits bursts of digital information to orbiting satellites, and also contains a small integrated analog (121.5/243 MHz) homing beacon. Advanced beacons encode a GPS or GLONASS position into the signal. The fixed ELT unit 30 also sends an ELT activation output 68 (indicating that the ELT unit 30 has been activated) to the aircraft avionics systems 28.

Figure 2:
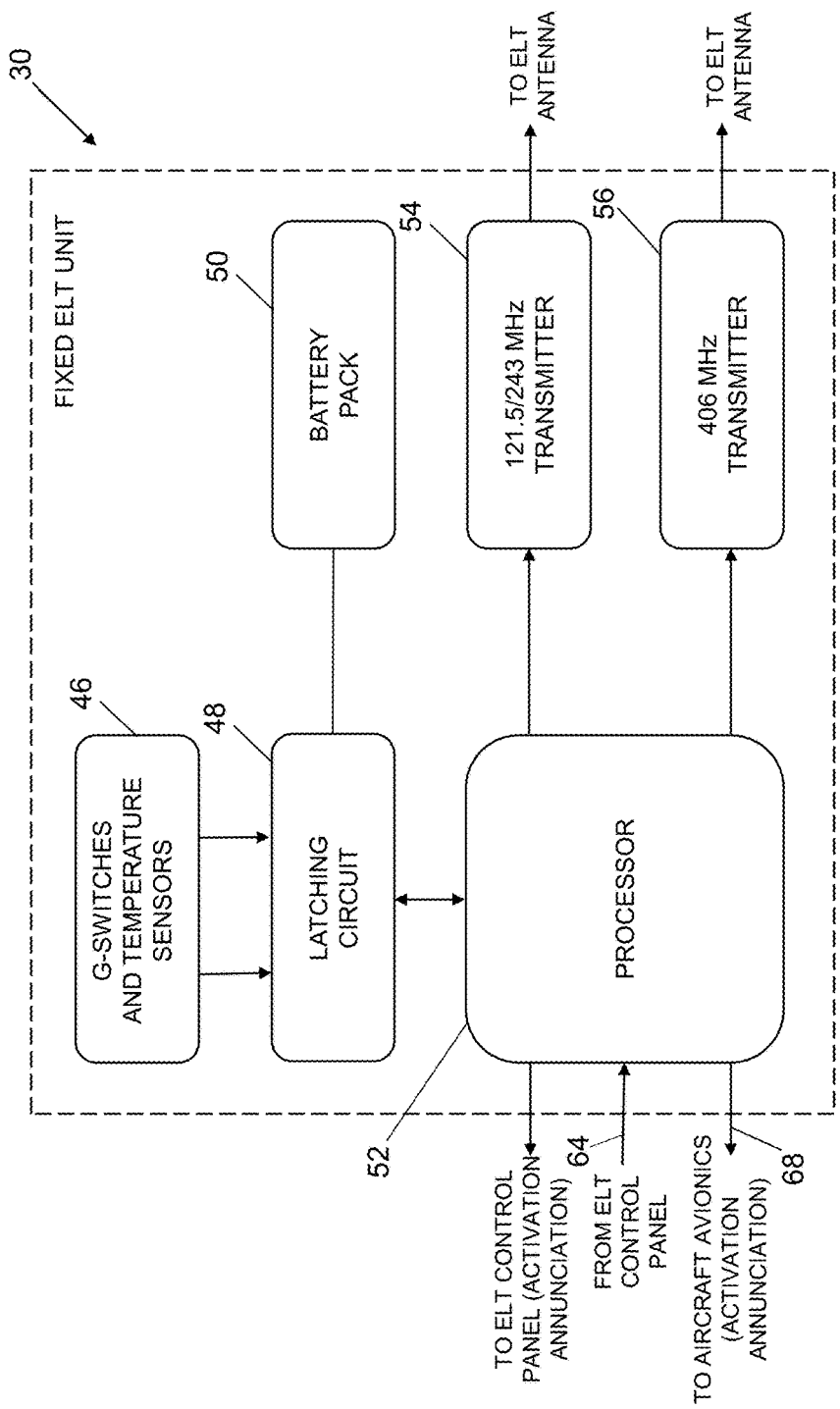
FIG. 2 is a block diagram identifying some major components and interfaces of a typical ELT.

FIG. 2 identifies some components of a typical ELT unit 30. In the embodiment depicted in FIG. 2, the internal sensors 46 include G-switches that detect high accelerations/decelerations indicative of a crash impact for multiple axes and high-temperature switches that detect temperatures associated with a fire. The states of the internal switches 46 are stored in a latching circuit 48, which is powered by a battery pack 50. All functions of the ELT unit 30 are under the control of a microprocessor 52, which receives electrical power from the battery pack 50 via the latching circuit 48. In the event of a crash, the microprocessor 52 activates the transmitter 54 to transmit the standard swept tone on 121.5 MHz, lasting until battery power is exhausted. This 121.5-MHz signal is mainly used to pinpoint the beacon during search and rescue operations. In addition, for the first 24 hours of operation, the microprocessor periodically activates the transmitter 56 to transmit a 406-MHz signal, e.g., at 50-second intervals. This transmission contains identification data programmed into the beacon, which is received by the COSPAS-SARSAT satellites. The transmitted data is referenced in a database (maintained by the national authority responsible for ELT registration) and used to identify the beacon and owner.

The ELT activation methods have a number of significant issues, the primary one of which is a limited success rate in locating major crashes. These limitations arise primarily due to the activation methods, i.e., the internal sensors activate upon a crash event with sufficient decelerations/accelerations. The issues from this primary ELT concept of operations include:

1) Crash impacts that do not have sufficient decelerations to trigger the ELT. These may occur because of lower speeds, impact attitudes etc.

2) Failure of the flight crew to activate the ELT. This may be due to the flight crew being fully engaged with aircraft recovery attempts or it may be due to flight crew members intentionally not activating location equipment.

3) Crash impacts that take place with aircraft attitudes that interfere with transmissions. For example, an aircraft that impacts while inverted would place the ELT system in a position where its transmissions could not be uplinked).

4) Crash impacts which disable the ELT system (e.g., shearing off the ELT antenna before the location can be uplinked or determined) or which block ELT transmissions (e.g., where the antenna is immersed in water).

5) A final concept of operations-based limitation is that ELTs must rely on large internal batteries for power since the crash forces that may activate them may also disable aircraft power sources. These internal batteries can be a source of issues as well and there is significant interest in reducing or doing away with these batteries.

The standards for a second generation of ELTs are in process. The requirements in this developing standard address the aforementioned issue of limited success rate in crash location by focusing on fusing extensive internal aircraft state information, such as the status of the aircraft engines, with aircraft trajectory and attitude information to provide new, high-assurance trigger inputs to the second-generation ELTs to activate the emergency transmissions upon indications that a crash is probable.

This second-generation ELT approach has a number of drawbacks for implementation, including requiring fairly extensive use of a diverse set of aircraft avionics data inputs and trigger algorithm implementation in already highly integrated and tightly regulated avionics components. These implementation issues, while intended to support addressing the technical issues with current ELTs, will impose significant operational costs. In particular they will require extensive development and certification time and costs that will need to be replicated for multiple aircraft/avionics architectures and they will have significant installation costs that will probably result in significant impacts on airline uptake and uptake timing for implementing these capabilities in their operational aircraft.

ADT systems are another rapidly emerging class of systems. ADT systems support aircraft emergency location as well as normal aircraft tracking. These systems generally include airborne-based components (the airborne segment), space-based communications and positioning functions (the space segment) and ground-based control and reporting functions (the ground segment).

Figure 3:
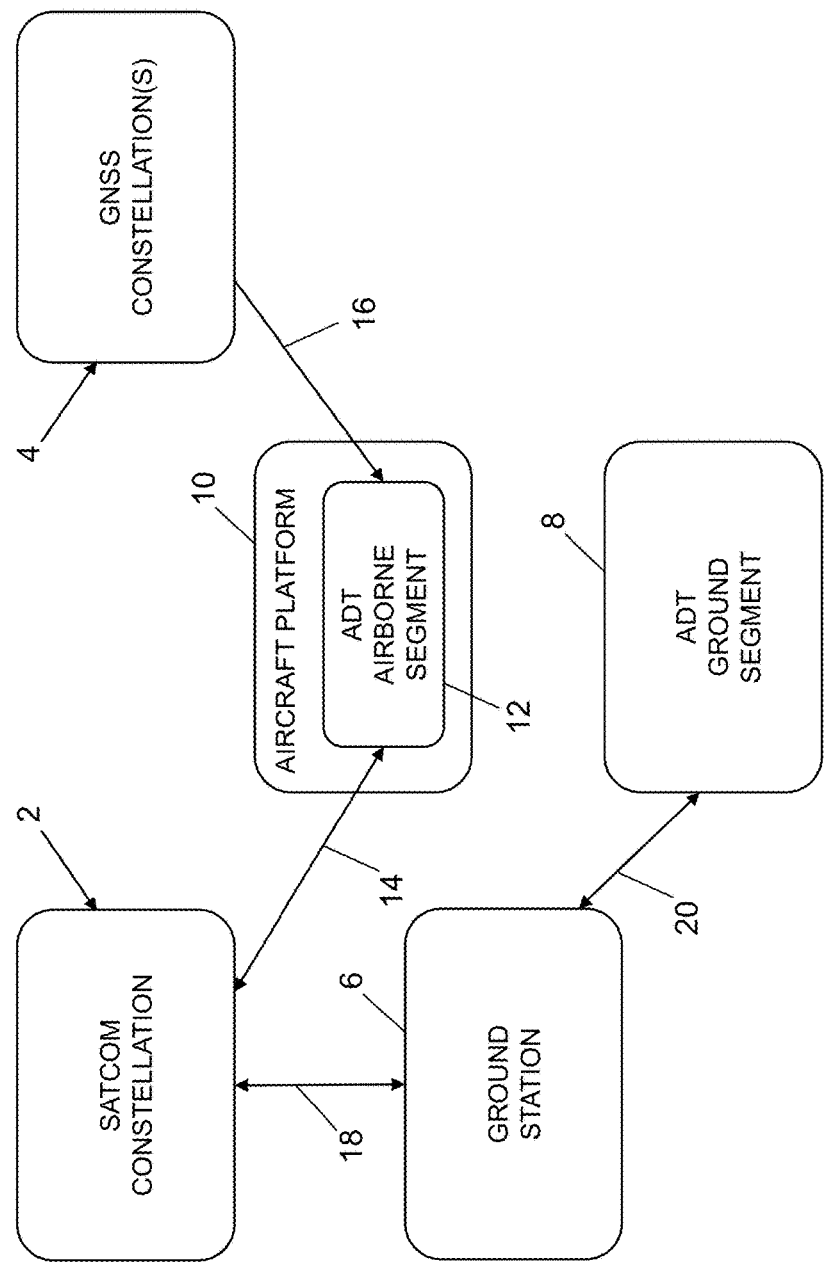
FIG. 3 is a block diagram identifying major subsystems of a global aircraft tracking system having an ADT unit as part of an airborne segment in accordance with some embodiments.

FIG. 3 identifies major subsystems of a global aircraft tracking system having an ADT airborne segment 12 in accordance with some embodiments. The ADT airborne segment 12 is installed on an aircraft platform 10 (e.g., a commercial aircraft). The global aircraft tracking system also includes a space segment and a ground segment. The space segment consists of the commercial SATCOM constellation 2 and the GNSS constellation(s) 4. The ADT airborne segment 12 communicates with the satellites of the SATCOM constellation 2 via a two-way data packet-based RF communication link 14 and receives Global Navigation Satellite Systems (GNSS)-based positioning data 16 from the satellites of the GNSS constellation(s) 4. A ground station 6 communicates with the satellites of the SATCOM constellation 2 via a two-way data packet-based or circuit/connection based RF communication link 18 and communicates with an ADT ground segment 8 via a terrestrial data network 20. The ADT ground segment 8 provides the aircraft-in-distress location tracking service disclosed herein. In particular, the ADT ground segment 8 monitors and controls the ADT airborne segment 12 and disseminates data from the ADT airborne segment 12. This information can then be sent to other systems and stakeholders such as airline operation centers and air navigation service providers.

Some ADT units have minimal integration with aircraft avionics systems and limited crew interfaces. This limited integration significantly simplifies installation requirements and overall system variation from aircraft model to aircraft model and airline to airline and associated costs of this variation. An ADT system will typically also implement some degree of tamper-proof design features to limit or do away with the flight crew ability to disable tracking.

Figure 4:
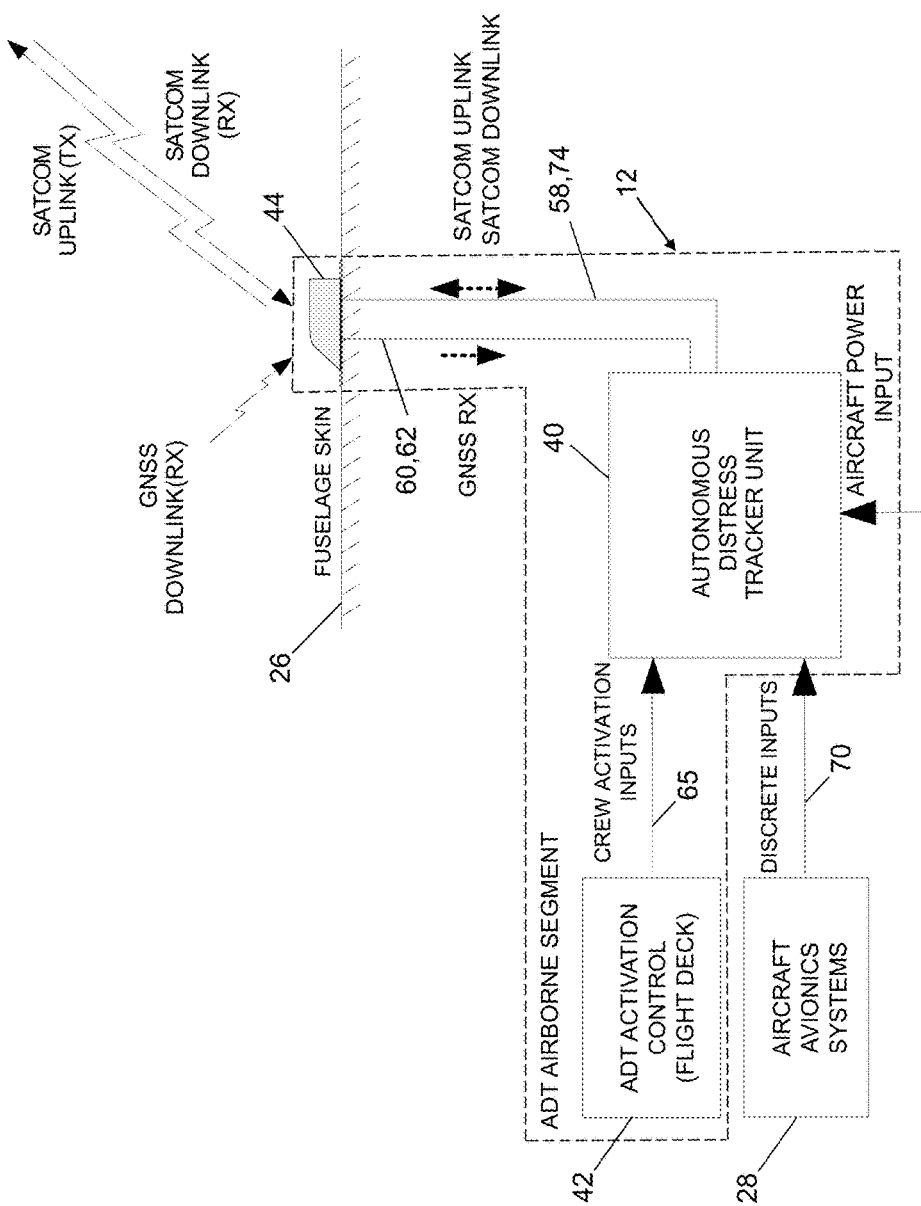
FIG. 4 is a diagram showing major components of an ADT airborne segment (including an ADT unit) for a stand-alone ADT architecture.

In accordance with some configurations, the ADT system may have a dedicated specially designed flight deck interface and a general interface to aircraft data-buses and general support for aircraft input and discrete output interfaces. A typical stand-alone ADT configuration for the airborne segment 12 onboard an aircraft platform is depicted in FIG. 4. This installation comprises an ADT unit 40, an ADT antenna 44 mounted on an external surface of a fuselage skin 26, and an ADT activation control 42 on the flight deck, which can be manually operated by a member of the flight crew. The ADT unit 40 also receives discrete inputs 70 from the aircraft avionics systems 28. The ADT unit can be triggered to transmit a distress signal based on the crew activation inputs 65 from the ADT activation control 42 and the discrete inputs 70 from the aircraft avionics systems 28.

Figures 23A, 23B:
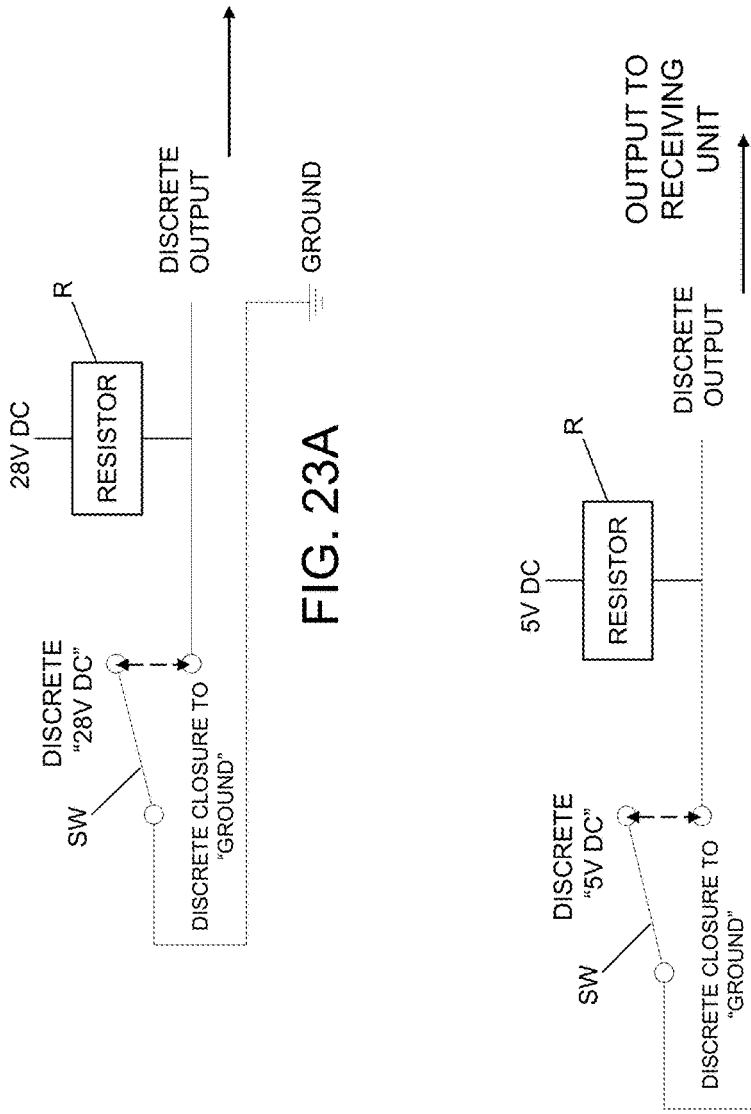
FIGS. 23A through 23D are diagrams showing different switch configurations for outputting discretes: a 28-V discrete (FIG. 23A); a 5-V discrete (FIG. 23B); an Open/Ground discrete (FIG. 23C); and an Open/Closed discrete (FIG. 23D).
Figure 23C:
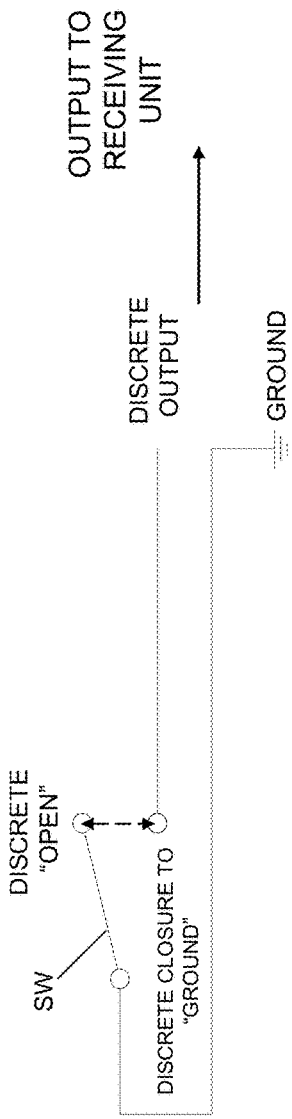
Figure 23D:
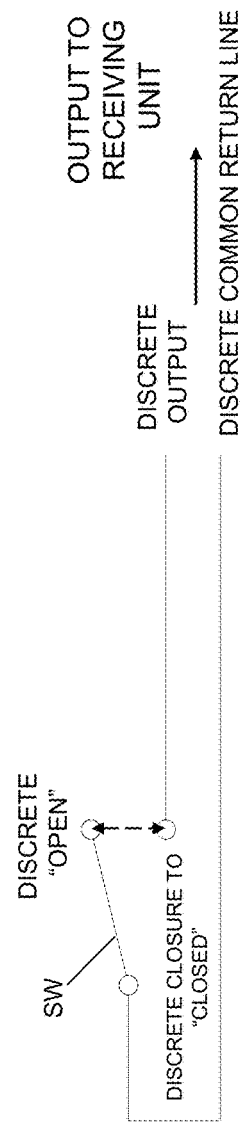

Discrete inputs and outputs are simple and environmentally robust means of sending signals between avionics units. Discrete data inputs and outputs use analog signals that are typically limited to two states, the equivalent of ON or OFF. These two states can be implemented by a high voltage level (typically 5 V or 28 V) versus a grounded (0 V) level or an open circuit (infinite impedance) versus a closed circuit (zero impedance). FIGS. 23A through 23D are diagrams showing different switch configurations for outputting different types of discretes: a 28-V discrete (FIG. 23A); a 5-V discrete (FIG. 23B); an Open/Ground discrete (FIG. 23C); and an Open/Closed discrete (FIG. 23D). (In FIGS. 23A-23D, "SW" indicates a switch and "R" indicates a resistor.) Using discretes to transmit signals is very limiting in the amount of data that can be transferred. These are typically used to signal the changing of relatively infrequent events, for example, an ELT activation. However, these are very robust signaling paths that are largely immune to noise and do not require closely synchronized system clocks.

In addition, the ADT unit 40 receives the GNSS signals and transmits relevant tracking information such as current aircraft latitude, longitude, altitude and attitude to the communication satellites using the ADT antenna 44. More specifically, the ADT unit 40 receives radio frequency (RF) inputs from the ADT antenna 44, including satellite communications (SATCOM) RF inputs 58 (e.g., messages from the ground segment over the Iridium network), GPS RF inputs 60 and GLONASS RF inputs 62. The ADT unit 40 also provides SATCOM RF outputs 74 to the ADT antenna unit 44 (e.g., messages to the ground segment over the Iridium network).

A typical ADT system will integrate ADT internal rate sensors data and ADT-developed GNSS position data with trigger algorithms that evaluate combinations of aircraft positions, rates and attitudes to determine if the aircraft is in distress or abnormal conditions. These capabilities are used to support high accuracy, tamperproof aircraft tracking under normal, abnormal, and distress conditions. The ADT unit 40 also receives configuration commands from the ground to set trigger conditions for increased report rate for certain regions, during times of distress, or to increase report rate for an aircraft as desired by the operator.

The ADT system provides two related capabilities:

(a) An ability to track an aircraft with a high degree of accuracy in near real-time over worldwide operations during normal aircraft operating conditions. This normal condition tracking capability is equivalent to that found in existing aircraft tracking systems, but with the additional characteristic of being autonomous and tamperproof—i.e., a capability that cannot be disabled by the crew while the aircraft is in flight.

(b) A reliable ability to provide search and rescue organizations with highly accurate aircraft position data in the event of an aircraft in abnormal conditions or a distress situation. This abnormal/distress tracking and positioning function provides a capability similar to the existing automatic ELTs, involving transmissions providing aircraft identification and location information in the event of abnormal or distress conditions. This capability is provided using an internal sensor and the existing crew activation interfaces to send high-reporting-rate position reports to the ADT ground segment. Existing ELTs use crew activation or internal sensor inputs (G-switches) indicating a potential crash to trigger transmissions on the COSPAS/SARSAT constellation frequencies and on search and rescue beacon frequencies. The ADT system is intended to supplement or replace existing ELTs by providing superior aircraft location capabilities through the detection and reporting of aircraft position while the aircraft is in a distress state prior to a crash rather than after a crash has taken place.

The ADT system disclosed herein is also intended to support broad retrofit applicability for aircraft. To facilitate retrofitting, the ADT unit 40 may be in the form of a line replaceable unit (LRU) located within the fuselage pressure vessel. The ADT unit 40 may be either a crown-mounted unit or a lower lobe rack-mounted unit. For both the crown mount and the lower lobe rack mount options, the ADT unit 40 will be typically installed in the aft fuselage (aft of the wing rear spar and forward of the aft pressure bulkhead). The ADT unit 40 should be mounted on secondary (not primary) aircraft structure.

Figure 5:
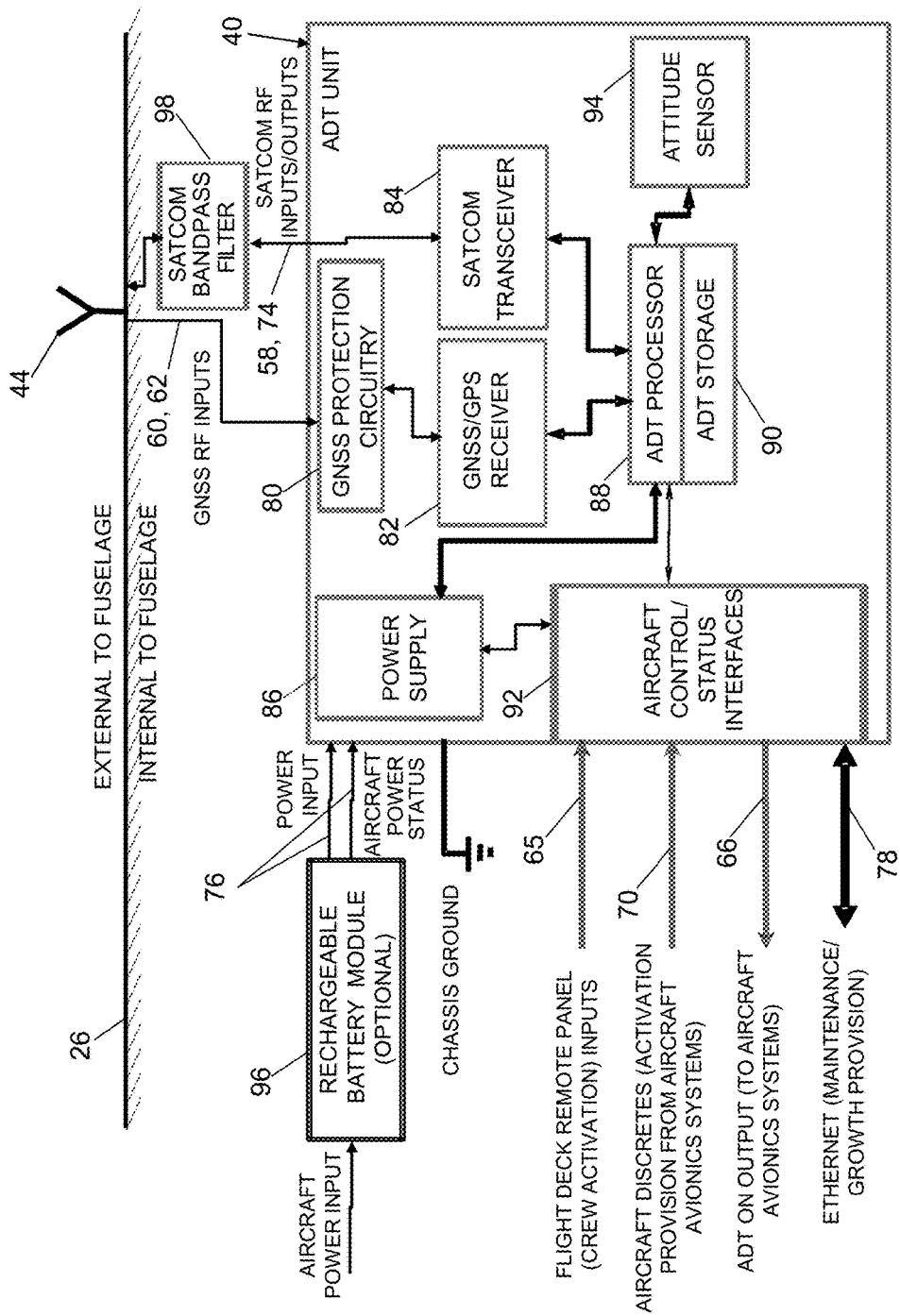
FIG. 5 is a block diagram identifying some components and interfaces of an ADT unit in accordance with one embodiment.

FIG. 5 is a block diagram identifying some components of an ADT unit 40 in accordance with one embodiment. The ADT unit 40 comprises GNSS protection circuitry 80 connected to the ADT antenna 44, a GPS receiver 82 connected to GNSS protection circuitry 80, a SATCOM transceiver 84 connected to a SATCOM bandpass filter 98, and an ADT processor 88 connected to the GPS receiver 82 and the SATCOM transceiver 84. The ADT processor 88 communicates with ADT storage 90 (i.e., a non-transitory tangible computer-readable medium), aircraft control/status interfaces 92, and an attitude sensor 94. The ADT unit 40 further comprises a power supply 86 that supplies electrical power to the ADT processor 88 and aircraft control/status interfaces 92. Optionally, the ADT unit 40 may be connected by aircraft power input 76 to a rechargeable battery module 96. This interface also provides indication of loss of aircraft power if the battery module is the direct power source.

As seen in FIG. 5, the aircraft control/status interfaces 92 receive crew activation inputs 65 from the flight deck and discrete inputs from the aircraft avionics systems 28, and may send an ADT ON (distress) output 66 to the aircraft avionics systems 28 when a distressed state is detected.

The ADT processor 88 is programmed with navigation data functionality (see ADT position and attitude data function 102 in FIG. 14) that takes input data from the GPS RF inputs, digital aircraft navigation inputs, data from internal sensors and data validity inputs and estimates and combines these per internal source prioritization logic or an input ground segment source command to provide high-quality estimates of aircraft location, speeds, track, attitudes and rates for use by other ADT functions and for inclusion in aircraft location/state reports.

There are several limitations for a typical ADT system. These include:

1) Dependence on commercial satellite networks (generally very high capability and reliability but with possible congestion issues and possible evolving business impacts on cost and availability).

2) Generally not making use of the COSPAS/SARSAT satellite system and its dedicated worldwide search and rescue links and bandwidth and direct support for search aircraft capabilities and reports to search and rescue command and control centers.

3) Based on the approach taken by the similar normal tracking systems, ADT flight deck interfaces will typically be dedicated tracking control interfaces requiring changes to the flight deck and to flight crew operations (with attendant training and documentation impacts). These changes will vary from aircraft model and potentially from airline to airline, potentially increasing installation and training costs associated with these systems.

4) No synchronization with the ELT and associated potentially different/unsynchronized crew inputs and emergency/distress state reporting.

Figure 6:
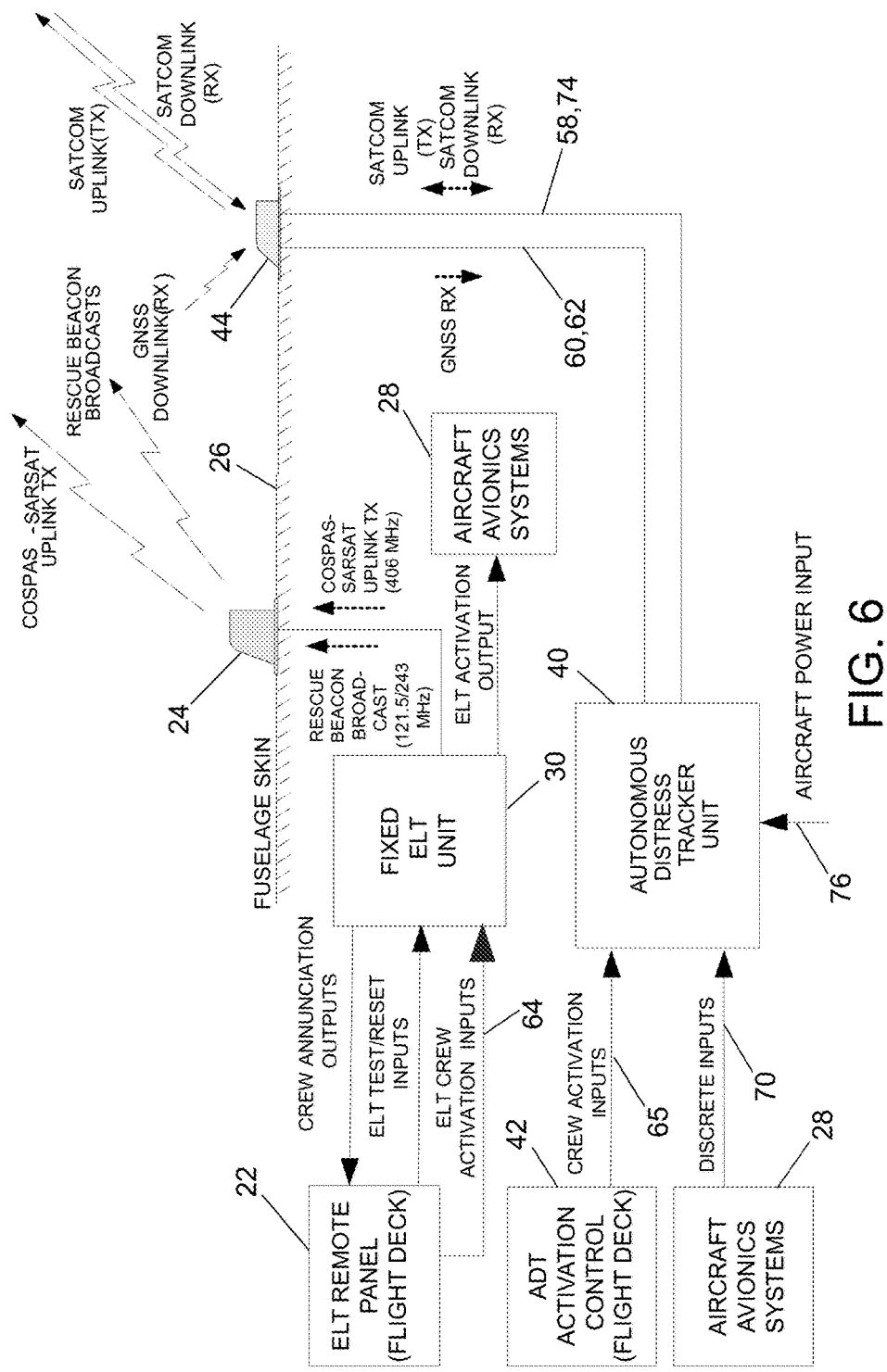
FIG. 6 is a diagram showing an architecture in which ELT and ADTs are separate and not coupled to each other.

FIG. 6 is a diagram showing an architecture in which the ELT and ADT are separate and not coupled to each other. This non-integrated ADT-ELT installation addresses several of the limitations of the stand-alone system—for example, it uses both the commercial SATCOM networks and the COSPAS/SARSAT satellite system. Non-integrated installations have other advantages, including simplified design requirements and no risk of any requirements to revisit ELT installation re-certification due to ELT configuration changes. However, other limitations for the stand-alone systems still apply in this case and other new ones are introduced.

The limitations of the configuration shown in FIG. 6 include:

1) ADT and ELT flight deck interfaces are separate and different, requiring changes to the flight deck and to flight crew operations (with attendant training and documentation impacts). These changes will vary from aircraft model to aircraft model and potentially from airline to airline, potentially increasing installation and training costs associated with these systems. The differences between the interfaces increase both training costs and potentially crew workload in an emergency situation.

2) No synchronization of the ADT and ELT systems and associated potentially different/unsynchronized crew inputs and emergency/distress state reporting.

3) The ELT limitations previously described in connection with the stand-alone ELT configuration depicted in FIG. 1 are still present.

The ADT-ELT system configurations disclosed hereinafter address the limitations described above for current ELTs, second generation ELTs and ADT systems. The ADT-ELT system configurations disclosed below cover integration options ranging from non-integrated configurations (described below with reference to FIGS. 8 and 9) with primarily cost improvements to integrated configurations (described below with reference to FIGS. 10-12) which also provide cost improvements together with potentially significant performance improvements over the non-integrated options.

The non-integrated configurations provide reductions in installation costs, crew training and crew workload in emergency situations due to the re-use of crew interfaces and in some cases other aircraft interfaces. The three basic non-integrated configurations: (1) a stand-alone ADT installation for the case where no ELT unit is or has been installed; (2) a separate (non-coupled) ADT-ELT architecture with common ELT flight deck control configuration for the case where an ELT unit is installed in addition to an ADT unit and they share the existing ELT flight deck switch but are otherwise separate; and (3) an ADT replacement for ELT configuration where the ADT unit is used to replace an existing ELT unit and the ELT flight switch and associated wiring is reused.

Figure 7:
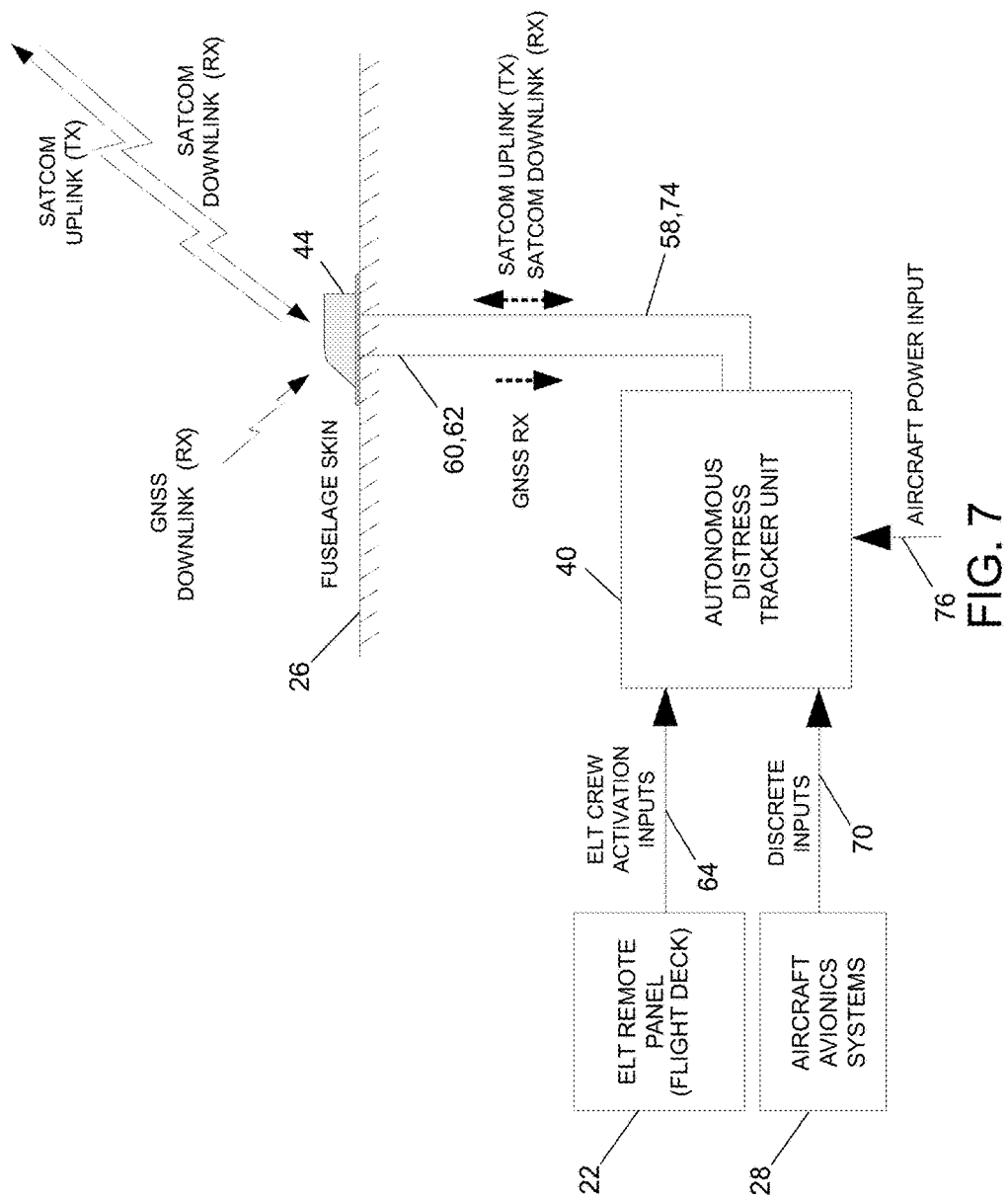
FIG. 7 is a diagram showing a stand-alone ADT architecture with re-use of an ELT flight deck control panel configuration in accordance with a first embodiment.

In contrast to the analogous approach shown in FIG. 4, FIG. 7 shows a configuration in which the crew interface for the ADT unit 40 can be an existing ELT remote panel 22. This feature means that no new parts need to be developed for this ADT system's control interface, that existing ELT crew interface engineering and installation designs can be used for the ADT control installation, and that flight crews can use extremely similar concepts of operations for ADT activation and ELT activation—minimizing training and reducing emergency situation workload.

Figure 8:
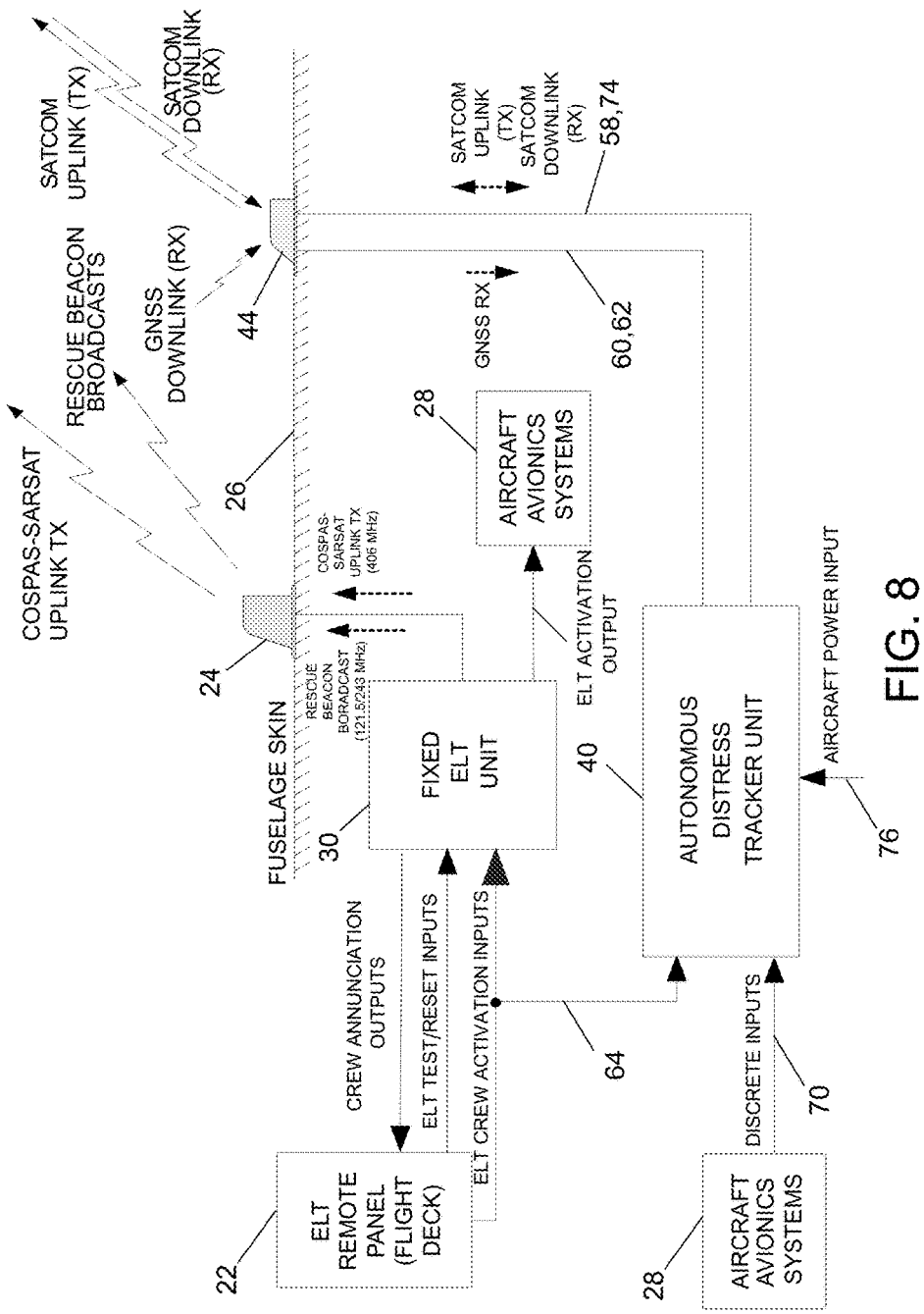
FIG. 8 is a diagram showing a non-coupled ADT-ELT architecture with common use of an ELT flight deck control panel configuration in accordance with a second embodiment.

In contrast to the approach shown in FIG. 6, FIG. 8 shows a configuration in which both the ELT unit 30 and the ADT unit 40 are connected to the ELT remote panel 22. This allows the joint use of the same ELT switch interface used in the separate ELT installation shown in FIGS. 1 and 7. This provides the advantages of part and installation design re-use, as well as the reduced training and emergency workload compared to the approach shown in FIG. 6.

Figure 9:
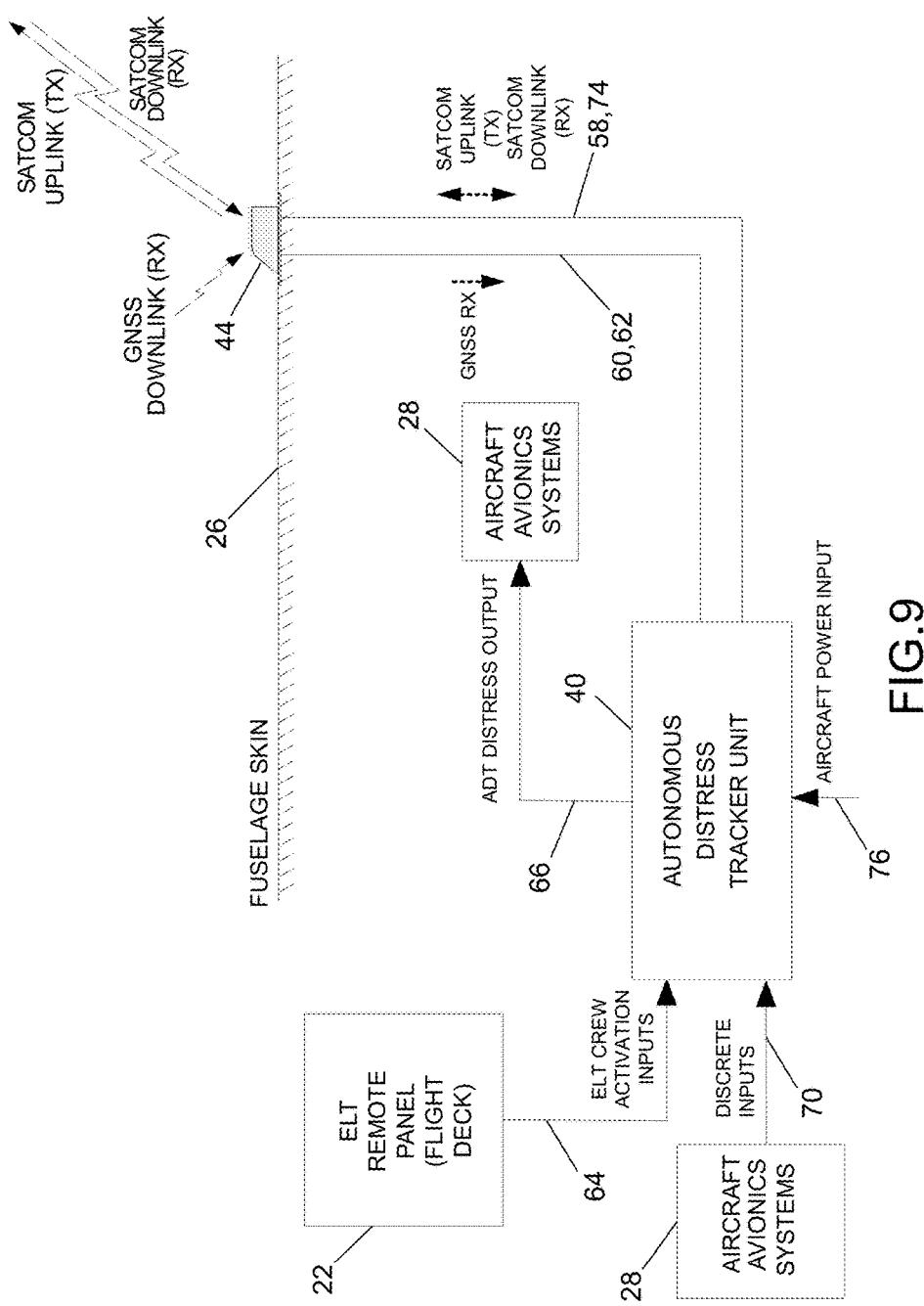
FIG. 9 is a diagram showing an architecture in which an existing fixed ELT installation has been replaced by an ADT system in accordance with a third embodiment featuring re-use of an ELT flight deck control panel and ELT inputs to an aircraft avionics systems.

FIG. 9 shows an ELT replacement configuration using an ADT unit 40. This configuration is similar to the stand-alone ADT configuration shown in FIG. 4. The ADT unit 40 receives ELT activation inputs 64 from the ELT remote panel 22 and aircraft discrete inputs 70 from the aircraft avionics systems 28 and transmits an ADT distress output 66 to the aircraft avionics systems 28. In this case, the ADT unit 40 is being used to replace an existing fixed ELT installation, either in a retrofit to in-service aircraft or as a replacement system during production. This configuration re-uses the existing ELT crew interface and associated wiring. It also provides an output to the existing ELT activation input on the existing aircraft avionics using existing wiring (new connectors could be required, but running new aircraft wiring can be a major impact and expense). This installation option again provides advantages for part and installation design re-use, as well as actual part and wiring re-use for both retrofit and forward fit (production) installation. This configuration also provides reduced training and emergency workload compared to the current standard approach.

The above-described non-integrated configurations do not provide any emergency location performance advantages over the standard non-integrated configurations. The following paragraphs describe (with reference to FIGS. 10-12) integrated ADT-ELT configuration options that provide emergency location performance advantages as well as the installation, training and crew workload advantages.

Figure 10:
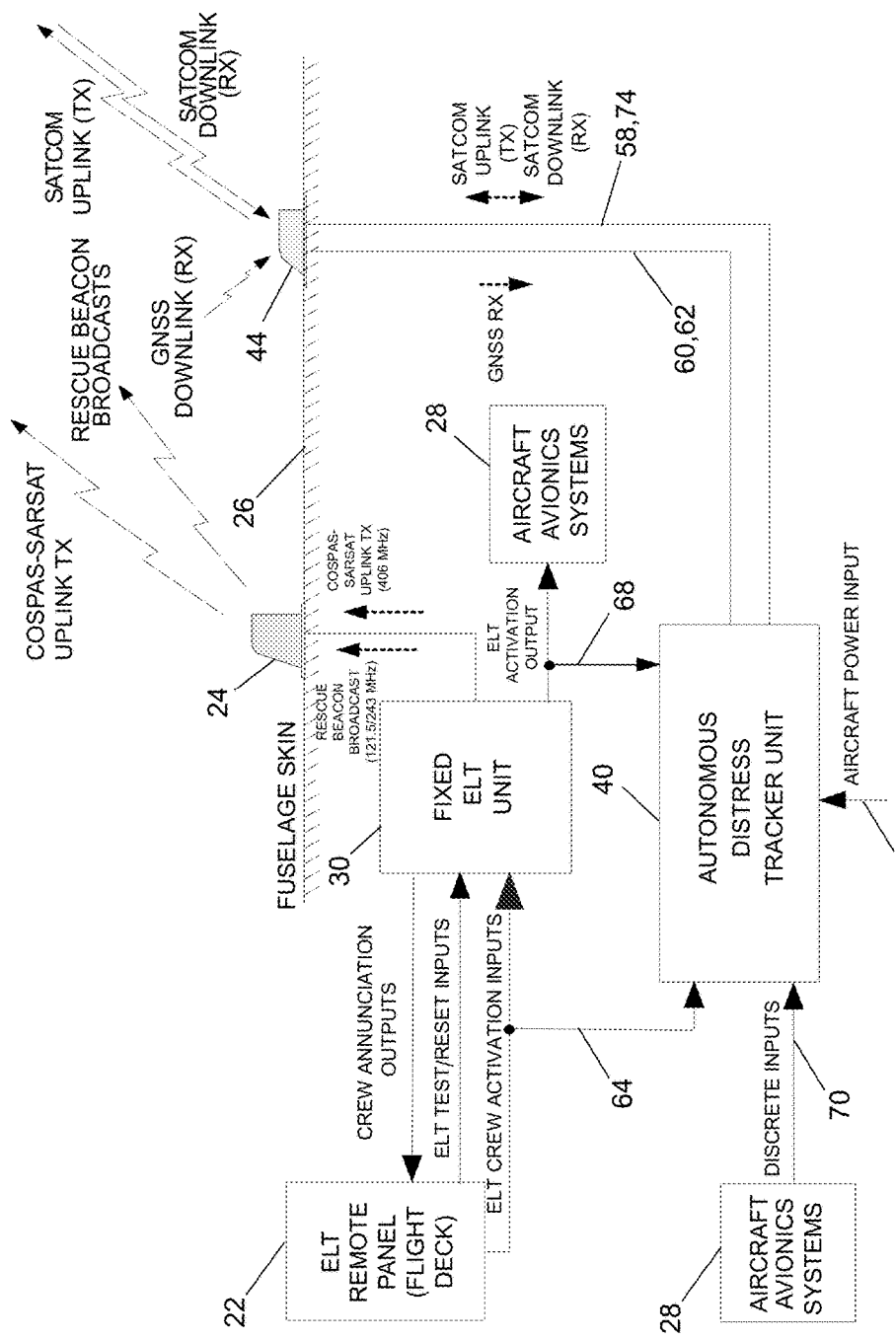
FIG. 10 is a diagram showing a loosely coupled (i.e., in parallel) ADT-ELT integrated architecture configuration in accordance with a fourth embodiment.

FIG. 10 shows a loosely coupled (i.e., in parallel) ADT-ELT integrated architecture configuration which, in addition to reductions in installation costs, crew training and crew workload in an emergency situations, further simplifies installations and crew impacts by the use of a common crew input in the form of the current ELT flight crew interface and also improves emergency location performance by allowing ADT distress outputs from the ADT unit 40 to be triggered by the ELT activation output 68 from the ELT unit 30 (whether due to crew activation of the ELT or due to ELT internal activation) as well as the standard ADT triggers. This also provides a means to alert airline operations centers and other ground-based control and monitoring centers of ELT activation in a near real-time manner.

In the configuration shown in FIG. 10, the ADT unit 40 receives flight crew ELT activation commands 64 output by the existing ELT remote panel 22 on the flight deck in parallel to the ELT unit 30, allowing the use of the single existing flight deck control unit with no changes to the crew operations concept of operations for the use of this switch. The ADT unit 40 also receives an existing ELT activation discrete output 68 in parallel to the aircraft avionics systems 28 that receive this discrete. This ELT activation discrete output 68 notifies the ADT internal monitors and the associated ground segment monitors when an ELT has been activated due to either flight crew activation or internal activation. A variant of this installation could use only this ELT activation discrete output 68 and not the flight deck-sourced ELT activation input 64; data on whether the ELT was activated due to crew or internal inputs would not be available in this case.

For ADTs installed near the ELT, these two inputs could be derived from the ELT connector wiring or from wiring close to the installed ELT, resulting in considerable savings in installation time and cost compared to running new wiring from the flight deck or aircraft avionics equipment bay. This loosely coupled ADT-ELT configuration provides reduced cost installations due to significantly reduced new wire run requirements and no new flight deck interface requirements. The re-use of the existing flight deck interface means there is no additional crew training or emergency workload from the existing fixed ELT installation, representing an additional reduction of training costs and workload impact from the non-integrated ADT-ELT installations.

The monitoring and use of the ELT activation inputs and ELT activation output by the ADT allows for synchronization of ADT and ELT distress transmissions, simplifying and providing for a more coordinated response by the various receiving ground systems and organizations (airline operations centers may be the initial recipients of ADT transmissions; national and international search and rescue organizations may be initial recipients of the ELT transmissions). This monitoring and use of the ELT activation inputs and ELT activation output by the ADT also allows for added data on the distress state of the aircraft, i.e., a crew-activated distress state or an ELT G-switch/temperature sensor-activated distress state.

Figure 11:
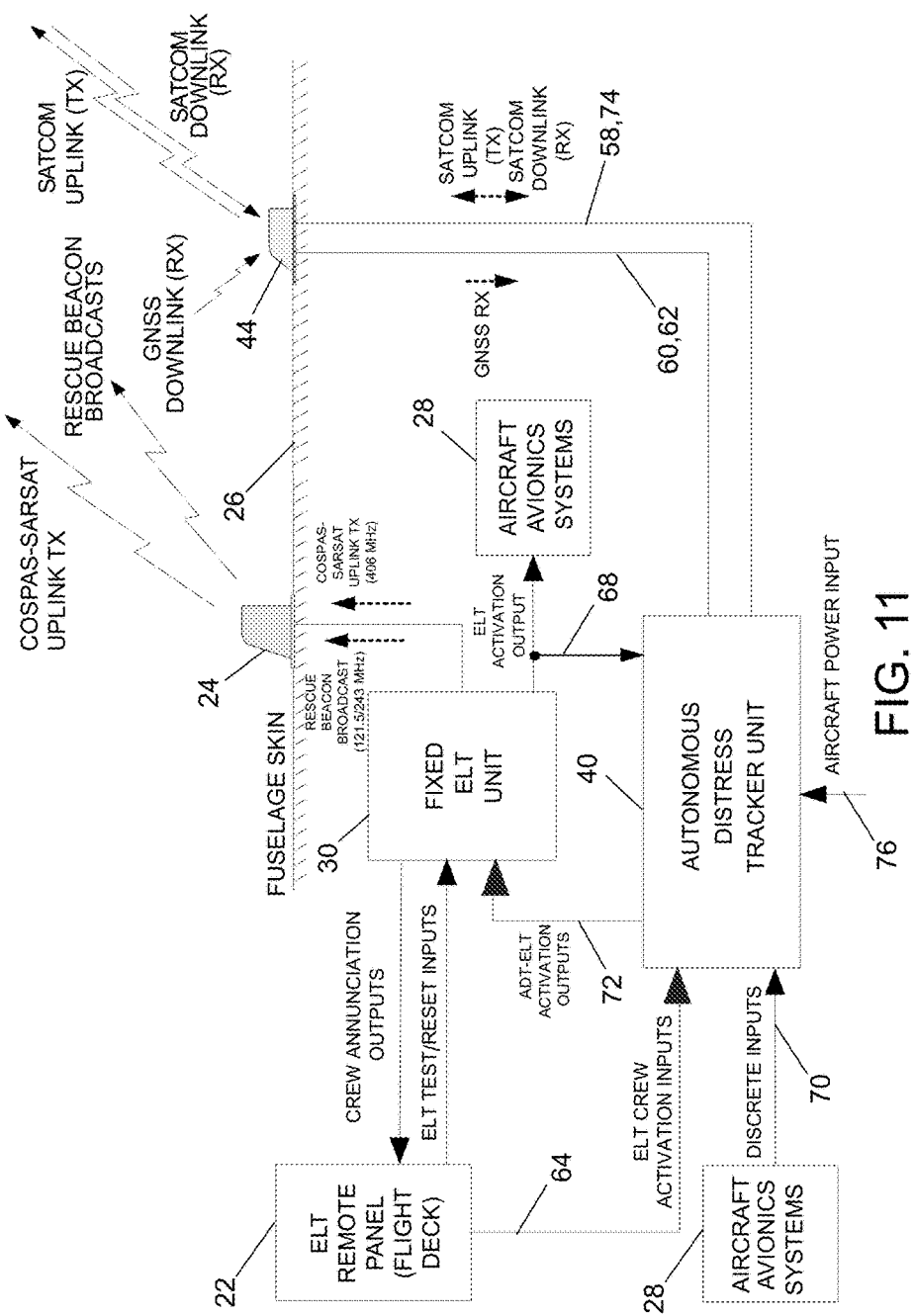
FIG. 11 is a diagram showing a tightly coupled (i.e., in series) ADT-ELT integrated architecture configuration in accordance with a fifth embodiment.

FIG. 11 shows a tightly coupled (i.e., in series) ADT-ELT integrated architecture configuration which, in addition to the benefits described above for the non-integrated and loosely coupled configurations (to wit, the ADT use of the existing ELT remote panel interfaces and activation of the ADT distress mode with ELT activation), provides functionality with major additional performance benefits. More specifically, this tightly coupled configuration further improves emergency location performance by allowing the ADT to trigger ELT distress broadcasts, using, for example, ADT internal trigger conditions indicating aircraft non-normal or distress flight conditions or ground segment commands uplinked from an airline operations center. This configuration may also support improved emergency reporting in the presence of SATCOM network congestion or RF interference scenarios.

The major difference from the loosely coupled configuration is that the ADT unit 40 in the tightly coupled configuration is now placed in series between the ELT remote panel 22 and the ELT unit 30. Thus the ADT unit 40 receives the ELT activation input 64 as shown in FIG. 11. This feature allows the ADT unit 40 to control the activation of the ELT unit 30 by sending ADT-ELT activation outputs 72 to the ELT unit 30. The conventional flight deck activation concept of operations of the ELT unit 30 is still supported by pass-through logic in the ADT unit 40 that immediately passes on flight deck commands to the ELT unit 30. Additionally, enhancements to reduce ELT false alarms can be implemented with ADT filtering of activation commands that are passed on to the ELT unit 30 (for example, by not passing on ELT activation commands when the aircraft is on the ground).

The tightly coupled configuration also allows for significant improvements to the emergency location performance of the integrated systems. The ADT aircraft dynamics and state-based trigger functions that are used to activate ADT abnormal or distress transmissions can also be used to activate the fixed ELT upon the detection of abnormal aircraft dynamics or states and prior to a crash.

The addition of ELT triggering by the ADT trigger functions also enhances integrated system performance by providing a redundant path (via the ELT COSPAS-SARSAT transmissions) for pre-crash emergency transmissions in the event that the ADT SATCOM transmissions are unreliable, for example, due to network congestion, gaps in SATCOM constellation coverage or interference from other on-aircraft systems (for example, Inmarsat to Iridium interference).

Ground segment activation of the existing ELTs over the ADT satellite connection is also possible, which may provide advantages for some locating/tracking scenarios since the ELTs provide local beacon transmissions as well as satellite uplink transmissions.

These added functions address both ADT and ELT shortcomings and provide functionality similar to (although possibly better than in some areas and not as good in others) to the proposed second-generation ELTs. This tightly integrated ADT-ELT configuration potentially provides these benefits with fewer avionics updates and aircraft installation impacts and hence for less cost and at a potentially earlier time, thereby supporting potentially earlier and larger airline uptake.

Figure 12:
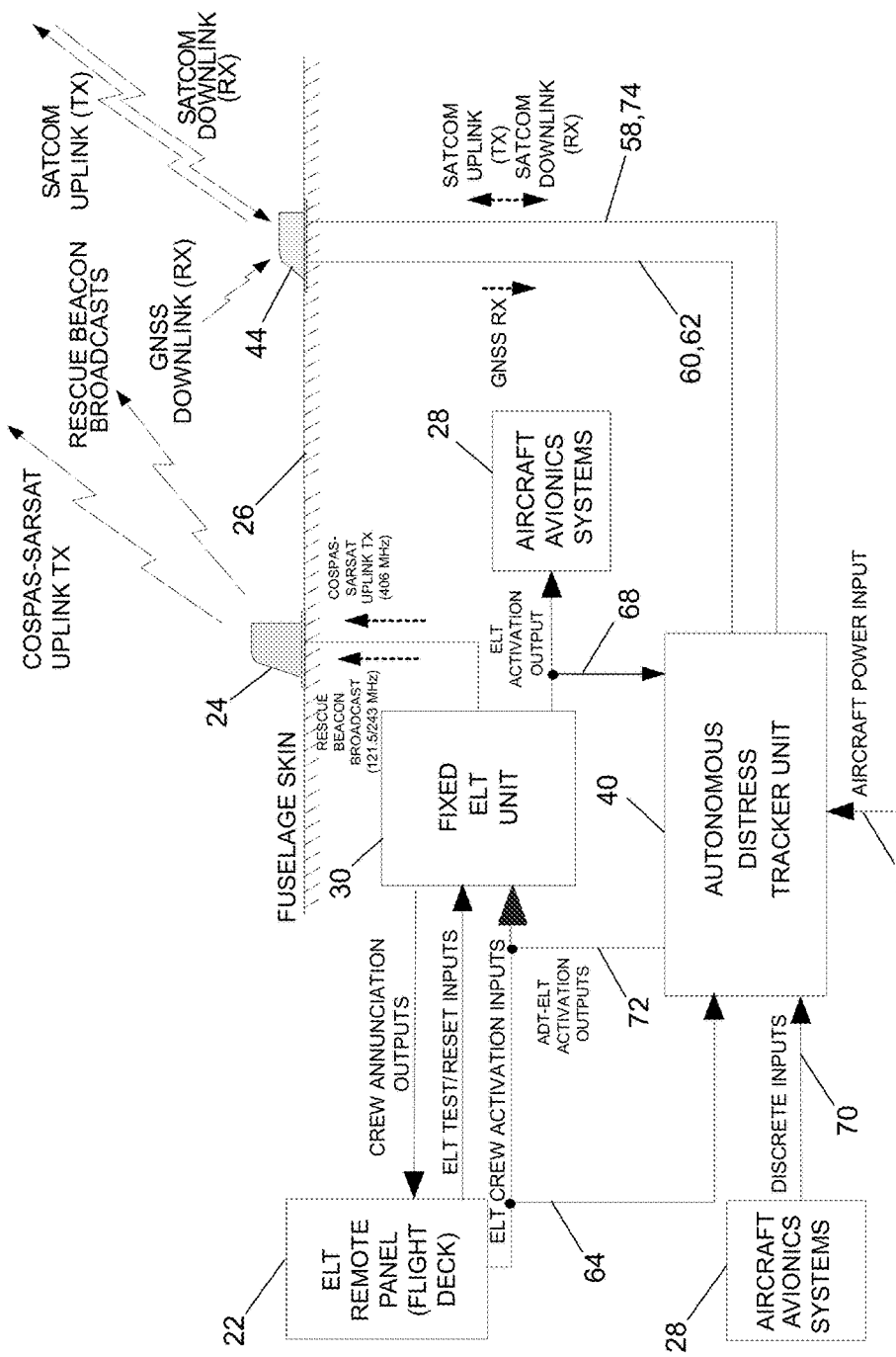
FIG. 12 is a diagram showing an ADT-ELT integrated architecture configuration with medium coupling (i.e., enhanced parallel) in accordance with a sixth embodiment.

FIG. 12 shows an ADT-ELT integrated architecture configuration with medium coupling (i.e., the ELT unit 30 and ADT unit 40 are in parallel and in series (referred to herein as "enhanced parallel")) that provides most of the benefits of the tightly coupled configuration with most of the reduced certification risk of the loosely coupled configuration. A key feature for the ADT-ELT activation output illustrated in FIG. 12 is that it is coupled into the existing ELT remote panel switch-to-ELT unit control path by an OR circuit (not shown), meaning that either the manually operated switch on the ELT remote panel 22 or the ADT unit 40 can activate the ELT unit 30 independently of each other. This allows the activation of the ELT unit 30 either in response to flight deck ELT activation inputs 64 per the existing concept of operations or in response to ADT-ELT activation outputs 72 from the ADT unit 40 triggered by the latter's own trigger determination logic. Using this "OR" connection allows the ADT unit 40 to apply advanced triggering capabilities to existing ELTs with no changes to the ELTs and very minor changes to the existing ELT wiring (and no ELT installation changes). This "OR" configuration reduces the certification risk since the existing ELT remote panel switch-to-ELT unit control path is maintained intact.

An ADT interface architecture which addresses several key aspects of integrating ADTs and other potential devices with existing fixed ELT installations and their associated existing aircraft interfaces will now be described with reference to FIGS. 13 and 14. This interface architecture provides the functions that interact with the ELT and aircraft interfaces in the multiple ways required to support the various integrated configurations described above and, of equal importance, it does so in a manner that is applicable across multiple aircraft models with different ELT flight deck controller types and ELTs from a range of different manufacturers (hence the "common" qualifier for these inputs). The integration of these functions into the existing ADT functions provides the benefits described for the non-integrated and loosely coupled ADT-ELT configurations. These functions and their integration into the existing ADT functions will now be described in detail.

Figure 13:
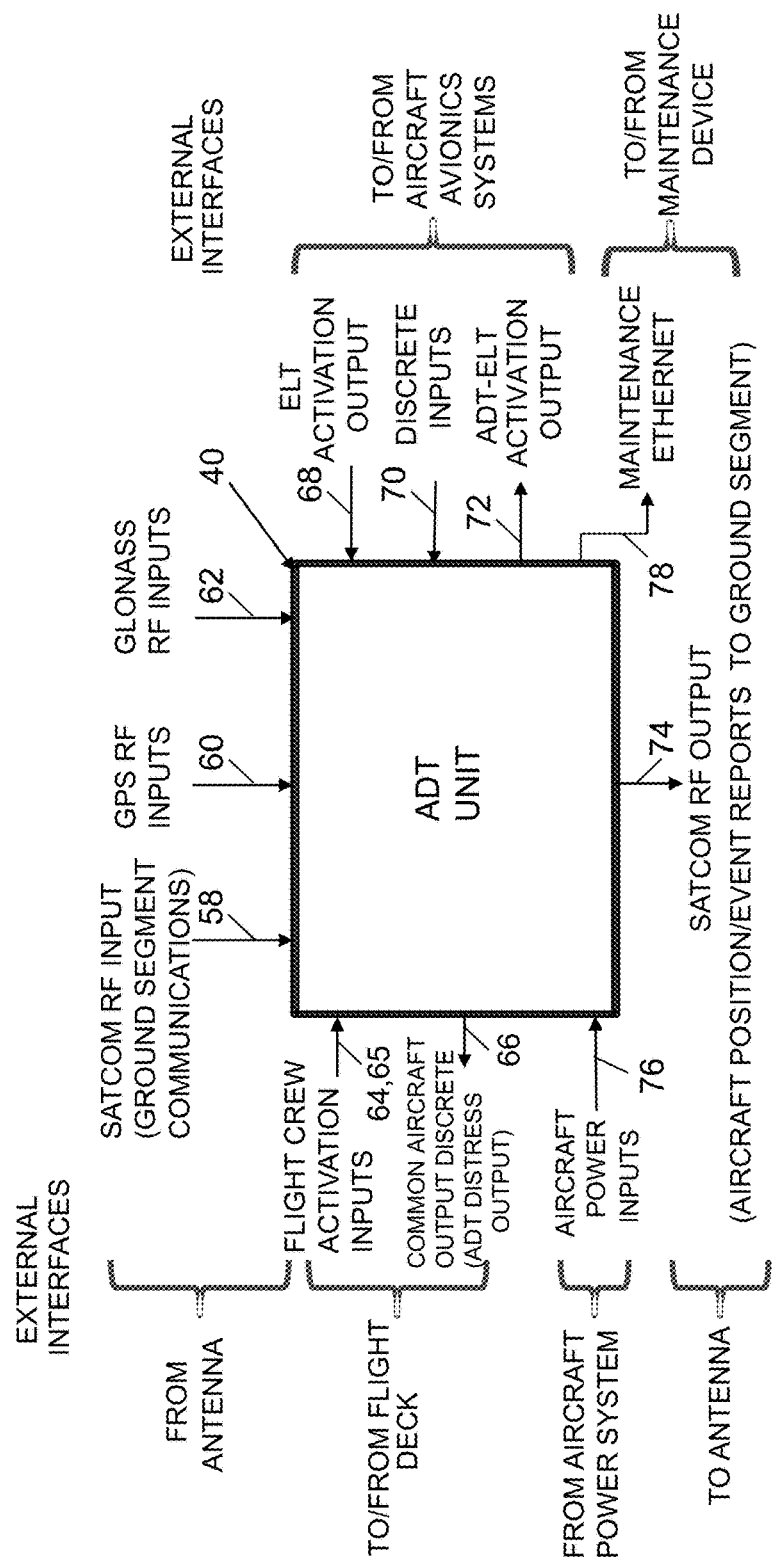
FIG. 13 identifies inputs to and outputs from a common ADT unit that can be incorporated in any one of the configurations depicted in FIGS. 4 and 6-12.

FIG. 13 identifies inputs to and outputs from an ADT unit 40 that can be incorporated in any one of the configurations depicted in FIGS. 4 and 6-12. In some configurations, not all of the inputs to and outputs from the ADT unit 40 are used. The ADT unit 40 receives radio frequency (RF) inputs from the ADT antenna 44, including satellite communications (SATCOM) RF inputs 58 (e.g., messages from the ground segment over the Iridium network), GPS RF inputs 60 and GLONASS RF inputs 62. The ADT unit 40 interfaces with the ELT flight deck remote panel. This interface allows the flight crew to activate the ADT distress transmission rate (i.e., flight crew activation inputs 64, 65). The ADT unit 40 has provisions for an output to provide notification to the flight crew of ADT distress transmissions (i.e., ADT distress outputs 66). The ADT unit 40 receives input DC power either directly from an aircraft power bus or through a battery module. This interface also provides indication of loss of aircraft power (i.e., aircraft power inputs 76) if the battery module is the direct power source. The ADT unit 40 provides SATCOM RF outputs 74 to the ADT antenna unit 44 (e.g., messages to the ground segment over the Iridium network). The ADT unit 40 has a maintenance Ethernet interface 78 to support maintenance actions and data loads. The ADT unit 40 has provisions to support detecting the ELT activation input 68 from the ELT unit 30 and to provide an ELT activation output 72 to the ELT unit 30. The ADT unit 40 supports discrete inputs 70 from the aircraft avionics systems 28.

Figure 14:
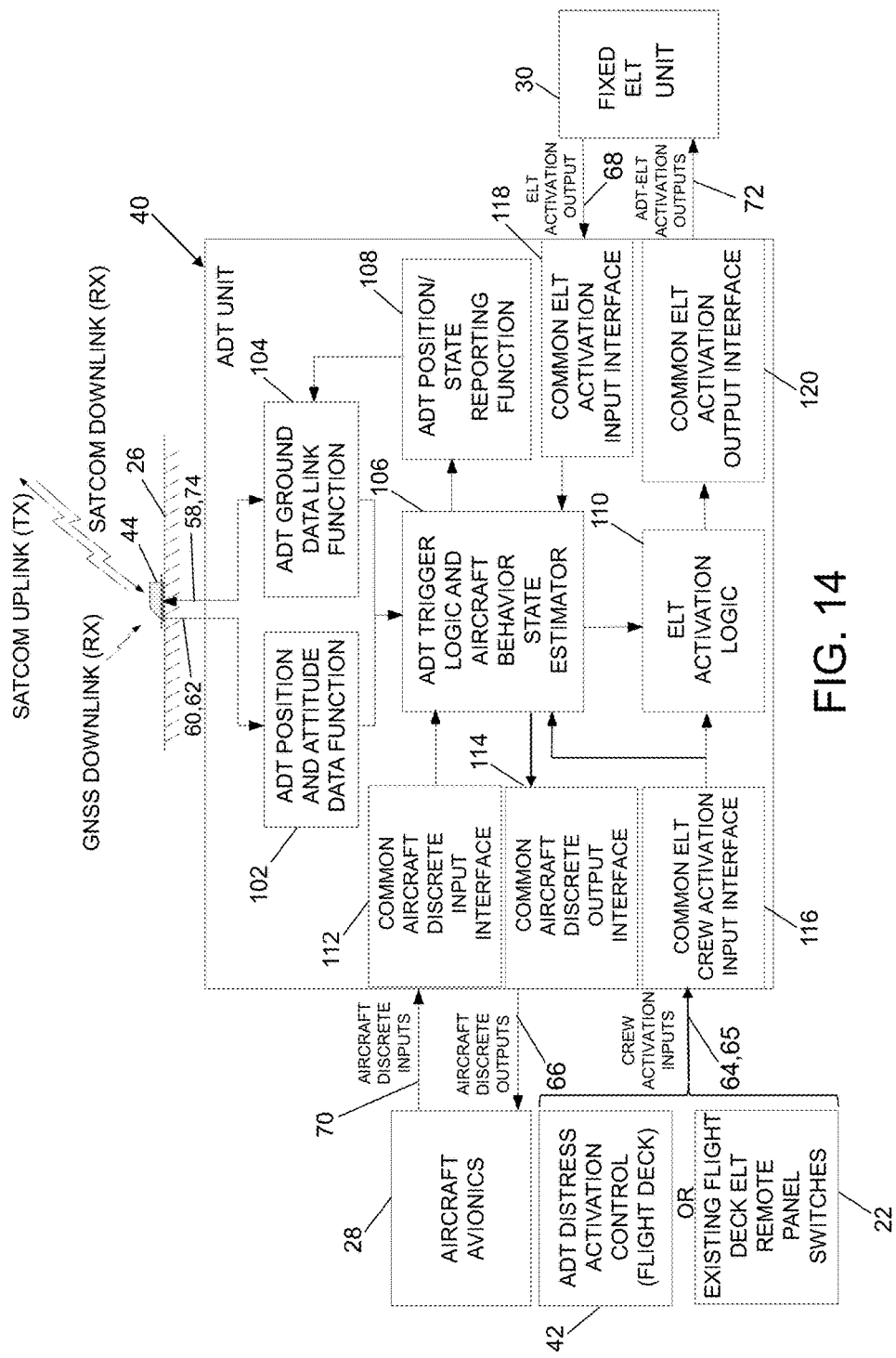
FIG. 14 is a diagram identifying ADT major functions and interfaces.

FIG. 14 is a diagram identifying major functions and interfaces of the ADT unit 40 which enable the multiple configuration options described above. The functions which are inherent to an ADT include the following: an ADT position and attitude data function 102; an ADT ground data link function 104; an ADT trigger logic and aircraft behavior state estimator 106; and an ADT position/state reporting function 108.

The ADT position and attitude data function 102 determines the current aircraft position (including altitude and velocities) and attitude from external (e.g., GNSS) and internal (e.g. internal sensors). More specifically, The ADT position and attitude data function 102 takes input data from GNSS RF inputs, digital airplane navigation inputs, data from internal sensors and data validity inputs and estimates and combines these per internal source prioritization logic or an input ground segment source command to provide high-quality estimates of aircraft location, speeds, track, attitudes and rates for use by other ADT functions and for aircraft location/state reports.

The ADT ground data link function 104 provides communication to and from the associated ground segment via the SATCOM network.

The ADT trigger logic and aircraft behavior state estimator 106 integrates aircraft position and attitude data, aircraft state data, ground segment commands and aircraft inputs to determine the ADT estimated aircraft behavior state and associated ADT reporting state—typically normal, abnormal or distress. More specifically, the ADT unit 40 uses an autonomous aircraft behavior state estimator algorithm to internally generate triggers for alerts and distress calls. The aircraft behavior estimate is based on the integration of four separate (but related) components or aspects of the observed aircraft state: the on-ground or airborne estimate, abnormal rates or attitudes for a given location as determined by dynamic trigger conditions, unusual altitudes for a given location and the loss of aircraft power inputs. The ADT unit 40 estimates aircraft behavior state using the internal GNSS, internal attitude and rate sensor data or aircraft input navigation data (if available) and aircraft power inputs.

The ADT position/state reporting function 108 reports aircraft position and state data at rates determined by the ADT trigger logic and aircraft behavior state estimator 106.

In some cases these inherent ADT functions may have additional interfaces added or additional internal logic added or modified to support the capabilities needed to enable the various integrated ADT-ELT configurations.

A second group of functions depicted in FIG. 14 are the ADT interface functions, including the following: a common aircraft discrete input interface 112; a common aircraft discrete output interface 114; a common ELT crew activation input interface 116; a common ELT activation input interface 118; and a common ELT activation output interface 120.

The final ADT function shown in FIG. 14 is the ELT activation logic 110. This function together with the common ELT activation output interface 120 enable implementation of the tightly and medium coupled ADT-ELT configurations. The logic components of this function are described in detail below with reference to FIG. 22.

Figure 15:
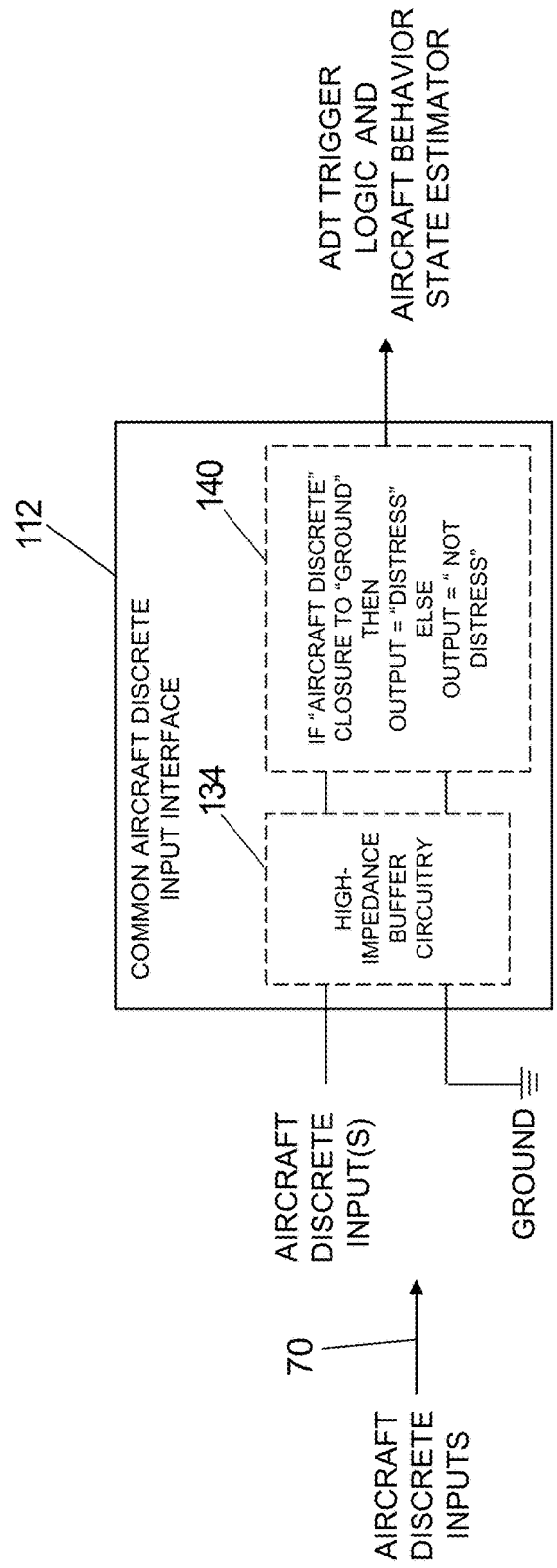
FIG. 15 is a diagram depicting functions that an ADT common aircraft discrete input interface should include to support a broad range of aircraft avionics integration options.

FIG. 15 is a diagram depicting functions that the common aircraft discrete input interface 112 should include to support a broad range of aircraft avionics integration options. The common aircraft discrete input interface 112 provides a basic interface for use in integrating the ADT trigger functions with aircraft state inputs from the aircraft avionics systems 28 that may have different sources and implementations across different aircraft models and with different aircraft avionics architectures. The common aircraft discrete input interface 112 comprises a group of discrete-type inputs. These could be a single input but would typically support multiple separate inputs. Each input would be a typical aircraft discrete input. Each input is a single wire input which, combined with the ADT ground input, would support detecting an open or grounded state for the discrete input.

Referring to FIG. 15, the common aircraft discrete input interface 112 comprises high-impedance buffer circuitry 134 and ADT common aircraft discrete input logic 140. The circuitry of the common aircraft discrete interface 112 in accordance with one implementation may take the form shown in FIG. 20 (to be described in detail below). The common aircraft discrete input interface 112 presents a high impedance so that the discrete inputs effectively draw no current. The open state for these inputs indicates either that the input is not activated or that the input is not present or used. The grounded state indicates that the input is active. These discretes are integrated into the ADT trigger logic and aircraft behavior state estimator function via a programmable input-to-aircraft state map. Table 1 shows typical values for a four-input example of an ADT discrete input mapping.

TABLE 1

| | Aircraft Behavior Discrete Input State | |
|---|---|---|
| Discrete input | Discrete Input Is Inactive | Discrete Input Is Active |
| Discrete input 1 | NORMAL | DISTRESS |
| Discrete input 2 | NORMAL | DISTRESS |
| Discrete input 3 | NORMAL | DISTRESS |
| Discrete input 4 | NORMAL | DISTRESS |

The aircraft behavior discrete input state map is implemented with default values (per the typical values shown above) and is updateable via ADT configuration file updates sent via a physical maintenance port update or over the air as a configuration update.

The ADT trigger logic and aircraft behavior state estimator 106 uses the aircraft behavior discrete input setting along with the other inputs (other aircraft state data, ground segment inputs, internal ADT sensor inputs etc.) to determine the estimated aircraft behavior state and any associated transmission states.

The common aircraft discrete input interface 112 provides a generic means to integrate diverse aircraft state inputs into the ADT trigger logic and hence into the integrated ADT-ELT functionality. This interface requires that an aircraft discrete and the associated discrete activation logic be present in the aircraft avionics system. The sourcing of this discrete and the implementation of the associated logic will vary based on the aircraft model and the associated avionics architecture.

There is also a significant amount of possible variation in the aircraft state information that this interface may be used to integrate into the ADT logic. One possibility is the engine out status for an aircraft. In this case, if no applicable discretes were available, then the aircraft avionics logic would be required to be implemented to drive available aircraft discrete outputs as inputs to the common aircraft discrete input interface 112.

This approach limits the by-aircraft model, by-avionics architecture and by-aircraft state input required variability to a single common interface. This interface is implemented with a generic, widely available set of physical inputs. The inputs from this interface are pre-integrated to the ADT trigger logic via an updateable, flexible mapping logic.

One alternative or complementary implementation of this interface could include other forms and polarities of discrete inputs (for example, a 5-V level is high/active and 0 V is low/inactive) to support a wider variety of potential discrete sources. Another alternative or complementary implementation of this interface could include avionics digital busses such as ARINC-429, ARINC-629 or ARINC-664/Ethernet inputs to provide the applicable aircraft state inputs in digital form.

Figure 16:
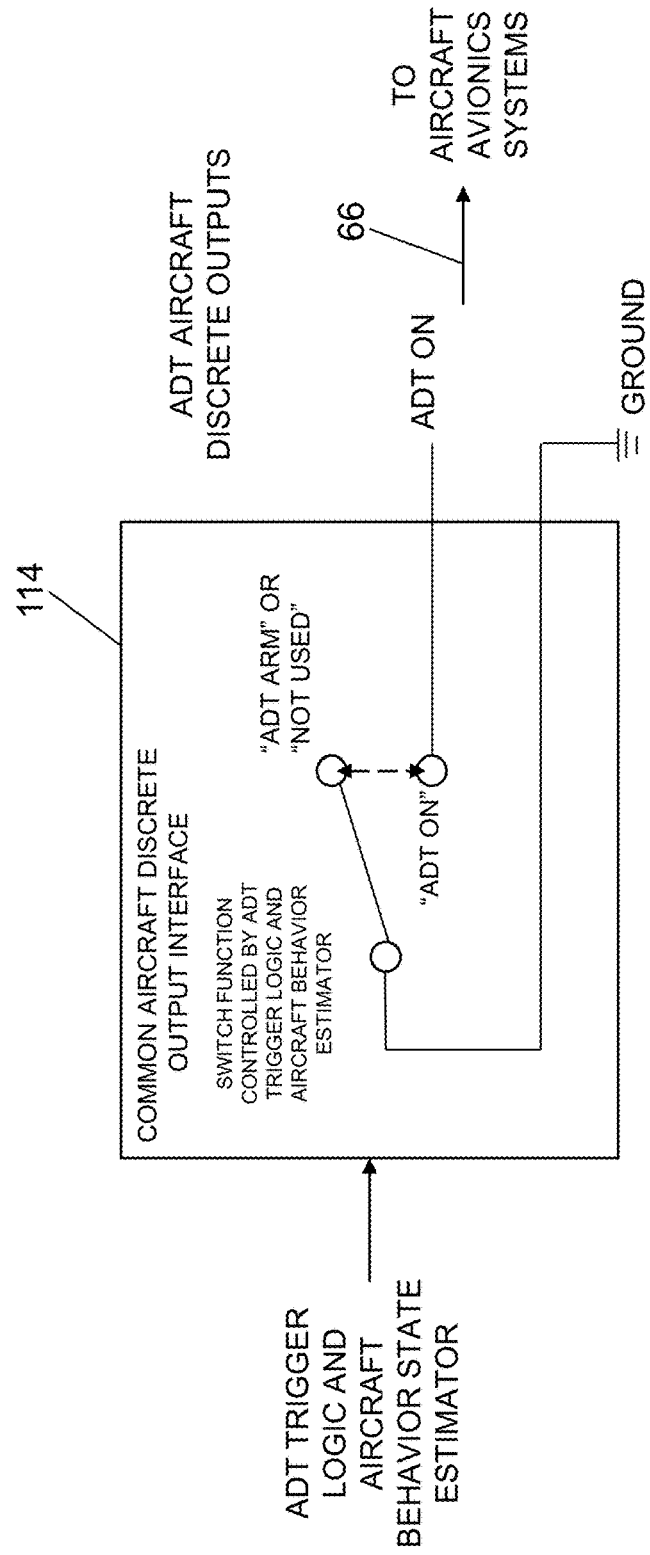
FIG. 16 is a diagram depicting functions that an ADT common aircraft discrete output interface should include in order to support a broad range of aircraft avionics integration options.

FIG. 16 is a diagram depicting functions that an ADT common aircraft discrete output interface 114 should include in order to support a broad range of aircraft avionics integration options. The switch function is controlled by the ADT trigger logic and aircraft behavior state estimator 106. The common aircraft discrete output interface 114 provides a means for annunciating entry into and exit from an aircraft distress state to connected aircraft avionics systems 28. This interface uses a discrete format that follows one commonly used by multiple models of ELTs. This output is a single-wire input which, combined with the ADT ground input, supports providing an open or grounded state for the discrete output. The common aircraft discrete output interface 114 presents a high impedance so that these inputs effectively draw no current.

The common aircraft discrete output interface 114 would typically not be used in an ADT-ELT configuration unless there is a requirement for crew or system notification of ADT distress state activation. It is more likely that this interface would be used in an ELT replacement installation where it is "plug-and-play" compatible with existing ELT ON interfaces to the aircraft avionics systems and would be used to support test/reset concepts of operations equivalent to the replaced ELT or crew/system activation notification concepts of operations if required.

The aircraft discrete output state is implemented with typical/default values as shown in Table 2 and is updateable via ADT configuration file updates sent via a physical maintenance port update or over the air as a configuration update. This common discrete output approach limits the by-aircraft model, by-avionics architecture and by-aircraft state input required variability for providing single common interface. This interface is implemented with generic, widely available set of physical outputs that is compatible with the existing ELT ON outputs that are currently integrated with a number of aircraft systems. The outputs from this interface are pre-integrated with the ADT trigger logic via a flexible, updateable mapping logic that both supports an ELT like annunciation concept of operations if needed or other uses if needed.

An alternative or complimentary implementation of this interface could include other forms and polarities of discrete inputs (for example, 5 V level is high/active and 0 V is low/inactive) to support a wider variety of potential discrete receivers in the aircraft avionics.

TABLE 2

| | Aircraft Discrete Output State | |
|---|---|---|
| | Discrete Input Is Inactive (Open) | Discrete Input Is Active (Grounded) |
| ADT Reporting State | NOT DISTRESS | DISTRESS |

Another alternative or complimentary implementation of this interface could include avionics digital bus-compatible output such as ARINC-429, ARINC-629 or ARINC-664/Ethernet inputs to provide the inputs to the applicable aircraft avionics in digital form.

Still referring to FIG. 14, the common ELT crew activation input interface 116 is used in all of the previously described coupled ADT-ELT configurations. This interface provides the means for the ADT unit 40 to detect the flight deck activation of the ELT unit 30 using existing flight deck controllers (e.g., the ELT remote panel 22). The common ELT crew activation input interface 116 comprises a pair of switch configurations that can be supported by two signal wires and the ADT ground. The use of the input signals for these switch configurations is shown in Table 3.

FIGS. 17A and 17B depict the internal wiring of the flight deck panel switch in accordance with the respective ELT remote panel switch configurations listed in Table 3. The left side of these figures represents the functionality in the switches (i.e., external to the ADT unit). When the ELT remote panel switch is set to ARM (EXTERNAL ON signal is an open circuit), the ADT unit sets the Flight Crew Input State to ARM; when the ELT remote panel switch is set to ON (EXTERNAL ON signal is a grounded circuit), the ADT unit sets the flight crew input state to ON.

TABLE 3

|  | Switch Configuration 1 | | Switch Configuration 2 | |
| --- | --- | --- | --- | --- |
| Input Signals | ELT ARM | ELT ON | ELT ARM | ELT ON |
| ELT External ON | Open | Grounded | Open | Shorted to ELT Common |
| ELT Common | n/a | n/a | Open | Shorted to ELT External ON |
| ADT Ground | — | — | n/a | n/a |

Figure 17C:
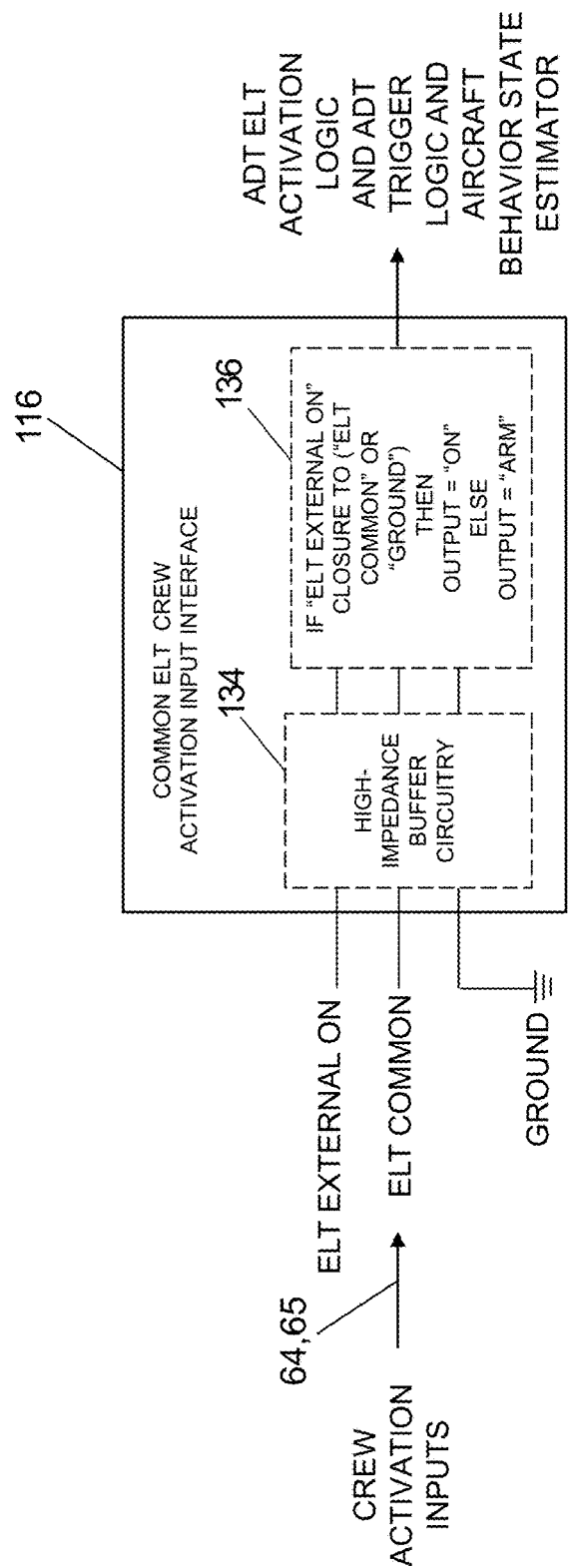
FIG. 17C is a diagram depicting a common ELT crew activation input interface function that allows ADT integration with either of the switch configurations shown in FIGS. 17A and 17B.

FIG. 17C depicts a common ELT crew activation input interface 116 that allows ADT integration with either of the switch configurations shown in FIGS. 17A and 17B. The common ELT crew activation input interface 116 comprises high-impedance buffer circuitry 134 and common ELT crew activation input logic 136. The circuitry of the common ELT crew activation input interface 116 in accordance with one implementation may take the form shown in FIG. 20 (to be described in detail below). The common ELT crew activation input logic 136 ORs the two switch configurations together to determine the ELT ARM or ELT ON states. Thus the common ELT crew activation input interface 116 does not need to be pre-configured for a particular switch configuration. This input signal state-to-ELT crew activation state mapping is shown in Table 4, in which the "Input Signals" are from either the ELT remote panel 22 or from the ADT distress activation control 42 (see FIG. 14), and "ELT ARM" and "ELT ON" are the corresponding activation states output by the common ELT crew activation input interface 116 to the ADT trigger logic and aircraft behavior state estimator 106 (see FIG. 14).

The outputs from the high-impedance buffer circuitry 134 will be the same as the inputs to this buffer circuitry. This buffer circuitry ensures that the interface circuits do not draw significant current from the input circuits and are solely sensing the state of those inputs.

TABLE 4

| Signals Input to Common ELT Crew Activation Input Interface | States Output by Common ELT Crew Activation Input Interface | |
| --- | --- | --- |
|  | ELT ARM | ELT ON |
| ELT External ON | Open | Grounded OR Shorted to Common |
| ELT Common | Open | Open OR Shorted to External ON |

(1) For the case where a switch is used that references the ELT External ON line to the ELT COMMON He, the input to the buffer circuitry 134 and the output from the buffer circuitry 134 will be as follows:

(a) If the ELT switch is activated (switch in ON position), then "ELT External ON" to "ELT COMMON" impedance=zero (closed circuit) and "ELT External ON" to GROUND impedance=infinite (open circuit).

(b) If the ELT switch is not activated (switch in "ARM" position), then "ELT External ON" to "ELT COMMON" impedance=infinite (open circuit) and "ELT External ON" to GROUND impedance=infinite (open circuit).

(2) For the case where a switch is used that references the ELT EXTERNAL ON line to GROUND, the input to the buffer circuitry 134 and the output from the buffer circuitry 134 will be as follows:

(a) If the ELT switch is activated (switch in ON position), then "ELT External ON" to GROUND impedance=zero (closed circuit) and "ELT External ON" to "ELT COMMON" impedance=infinite (open circuit).

(b) If the ELT switch is not activated (switch in "ARM" position, then "ELT External ON" to GROUND impedance=infinite (open circuit) and "ELT External ON" to "ELT COMMON" impedance=infinite (open circuit).

The common ELT crew activation input logic 136 operates such that if it sees either "ELT External ON" to GROUND impedance=zero (closed circuit) OR "ELT External ON" to "ELT COMMON" impedance=zero (closed circuit) it considers the ON command to be active.

This activation portion of the interface thus detects the two primary ELT crew activation states of ARM (the ELT is not active but is ready to transmit upon internal or external activation input) and ON (the ELT has been activated and is broadcasting distress signals). Test/reset signals are not detected by this interface directly, but would be seen as a transient ON signal on the activation portion of the interface and can be inferred by the ADT. The mapping of the activation states output by the common ELT crew activation input interface 116 to the aircraft states estimated by the ADT trigger logic and aircraft behavior state estimator 106 (see FIG. 14) is shown in Table 5.

TABLE 5

| States Output by Common ELT Crew Activation Input Interface | Aircraft States Estimated by ADT Trigger Logic and Aircraft Behavior State Estimator |
| --- | --- |
| ELT ARM | NORMAL |
| ELT ON | DISTRESS |
| ELT ON Transient (ELT TEST) | ABNORMAL/TEST |

The ELT crew activation input state map is implemented with default values and is updateable via ADT configuration file updates sent via a physical maintenance port update or over the air as a configuration update.

To summarize the foregoing, the switch position is set by the crew using the ELT remote panel 22 or the ADT distress activation control 42 (depending on what is installed). The open/grounded configuration set by the switch position and the switch type are interpreted by the common ELT crew activation input interface 116 as either "ELT ARM" or "ELT ON", as described in Table 4. Then the output from the common ELT crew activation input interface 116, i.e., "ELT ARM", "ELT ON" or a transient "ELT ON", are mapped to various aircraft state estimates ("Normal", "Distress" or "Abnormal/Test") per Table 5 in the ADT trigger logic and aircraft behavior state estimator 106. The aircraft state estimates from these crew inputs are then combined with other aircraft state estimates in the ADT trigger logic and aircraft behavior state estimator 106. This other logic and the fusion logic are disclosed in U.S. patent application Ser. No. 14/858,235, the disclosure of which is incorporated by reference herein in its entirety.

This common ELT crew activation input approach allows the re-use of the existing ELT flight deck switch types and switches themselves (and much of the associated wiring) that is a key enabler for reduced costs. This approach also allows for improved synchronization of the ADT-ELT responses for the loosely coupled ADT-ELT configuration and is a key component of putting the ADT in the ELT control path for the tightly coupled ADT-ELT configuration. The reduction of the high by-aircraft and by-ELT switch complexity to a fairly simple common ADT interface is a significant enabler for this approach. The choice to only use the ELT activation portion of the interface reduces complexity and associated technical and certification risks.

The common ELT crew activation input interface 116 can be pre-integrated with the ADT trigger logic and aircraft behavior state estimator 106 via a flexible, updateable mapping logic that supports the use of the fight deck ELT activation switch as a high priority indication of aircraft distress state in the default configuration or supporting other prioritizations via changes in the mapping if required.

The common ELT activation input interface 118 detects ELT activation using an existing ELT ON discrete output (i.e., ELT activation output 68) that is common across a range of existing ELTs. This discrete output is used by the ELT unit 30 to signal the aircraft avionics systems 28 that the ELT unit 30 has been activated, either due to crew inputs or due to internal ELT sensors (e.g., a G-switch set off by a high de-acceleration).

Figure 18:
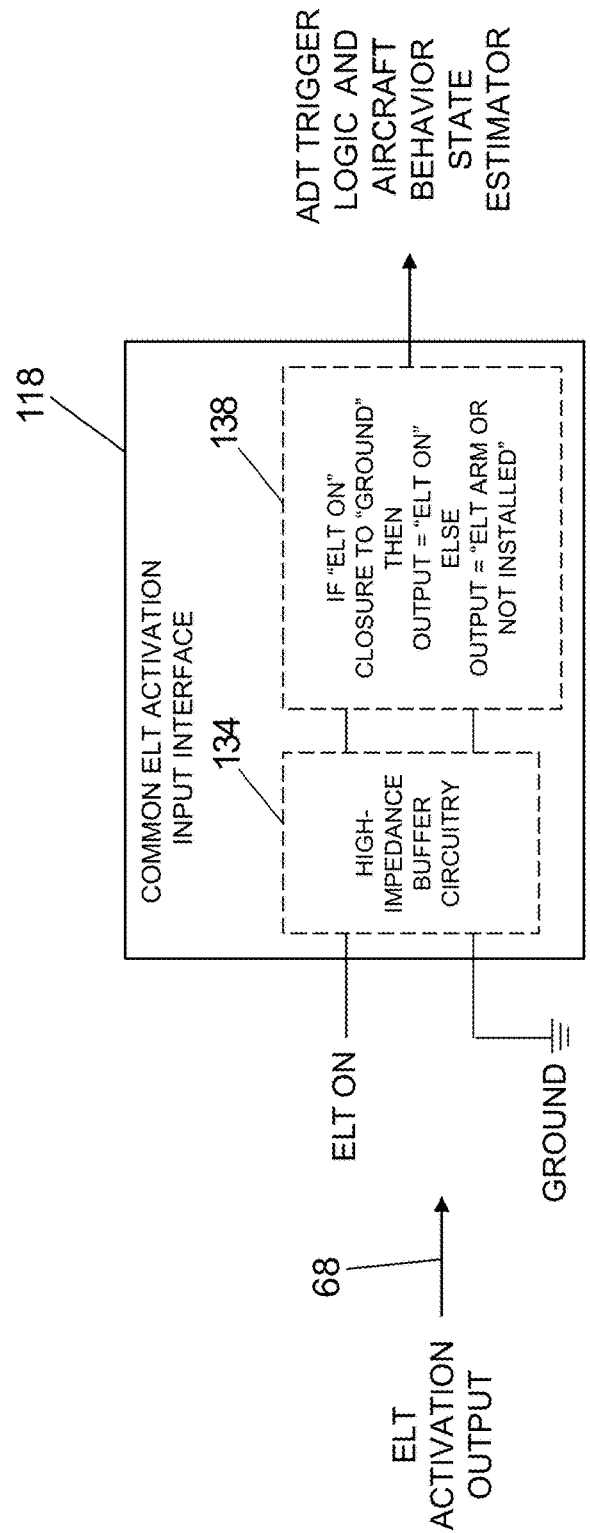
FIG. 18 is a diagram depicting functions that a common ELT activation input interface function that allows ADT integration with a broad range of ELT units.

The common ELT activation input interface 118 is implemented as a single wire plus the ADT ground physical input. As seen in FIG. 18, the common ELT activation input interface 118 comprises high-impedance buffer circuitry 134 and common ELT discrete activation input logic 138. The circuitry of the common ELT activation input interface 118 in accordance with one implementation may take the form shown in FIG. 20 (to be described in detail below). The common ELT discrete activation input logic 138 determines the ELT state as a function of the discrete input. The signal values-to-ELT state mapping for common ELT activation input interface 118 is shown in Table 6.

TABLE 6

| States of ELT unit | Discrete States of Common ELT Activation Input Interface |
|---|---|
| ELT ARM or not connected | Discrete Input Is Inactive (Open) |
| ELT ON | Discrete Input Is Active (Grounded) |

This mapping is updateable via ADT configuration file updates sent via a physical maintenance port update or over the air as a configuration update if there is a requirement to tailor the inputs for a different configuration, but this default mapping covers a wide range of ELT configurations.

The common ELT activation input interface 118 provides redundant and complementary data to the common ELT crew activation inputs. The mapping of the common ELT activation input builds on the state of the common ELT crew activation input as shown in Table 7. The mapping shown in Table 7 is implemented with default values and is updateable via ADT configuration file updates sent via a physical maintenance port update or over the air as a configuration update.

TABLE 7

| States Output by Common ELT Crew Activation Input Interface | States Output by Common ELT Activation Input Interface | Aircraft States Estimated by ADT Trigger Logic and Aircraft Behavior state estimator | Notes (Specific Crew/ELT Activation State) |
|---|---|---|---|
| ELT ARM | ELT ARM | NORMAL | Non-Activated ELT |
| ELT ON | ELT ON | DISTRESS | Crew Activation of ELT |
| ELT ON | ELT ARM or Not Connected | DISTRESS | Crew Activation of ELT |
| ELT ARM | ELT ON | ABNORMAL | ELT Self-Activation |
| ELT ON Transient (ELT TEST) | ELT ON Transient (ELT TEST) | ABNORMAL/ TEST | Test Activation of ELT |

The common ELT crew activation input interface 116 allows the ADT unit 40 to detect crew activation of the ELT unit 30. The common ELT activation input interface 118 provides a redundant path for that detection and adds visibility for non-crew-initiated ELT activations. This added visibility improves situational awareness at airline operations centers by adding the source of the ELT activation to the ADT reporting and supports improved synchronization between airline operations centers and rescue centers due to a common ELT activation situational picture.

The common ELT activation input interface 118 is pre-integrated with the ADT trigger logic via a flexible, updateable mapping logic that supports the use of the basic ELT concept of operations to provide additional information to an airline operations center in the default configuration or supports other prioritizations via changes in the mapping if required.

The common ELT activation output interface 120 is a component used in the tightly coupled (i.e., series) and medium coupled (i.e., enhanced parallel) ADT-ELT configurations shown in FIGS. 11 and 12. This interface provides the means for the ADT unit 40 to control the activation of the ELT unit 30 using existing ELT control inputs. This interface uses the same approach (building on the same data) as described with reference to the common ELT crew activation input interface 116 to provide ELT activation outputs applicable for a wide range of ELT types and aircraft installation configurations.

The common ELT activation output interface 120 provides two signal outputs (and the associated ADT ground) that support the two switch configurations previously identified as providing a broadly applicable ELT activation interface. These output signals are high-impedance Open/Grounded discrete signals that provide the functionality of the two switch configurations shown in FIGS. 19A and 19B. The output signals are configured as shown in Table 8 based on the command from the ELT activation logic 110 (see FIG. 14) for the ELT ARM or ELT ON state.

TABLE 8

| ADT Output Signals | Switch Configuration 1 | | Switch Configuration 2 | |
|---|---|---|---|---|
| | ELT ARM | ELT ON | ELT ARM | ELT ON |
| ELT External ON | Open | Grounded | Open | Shorted to Common |
| ELT Common | n/a | n/a | Open | Shorted to External ON |
| ADT Ground | — | — | n/a | n/a |

Figure 19A:
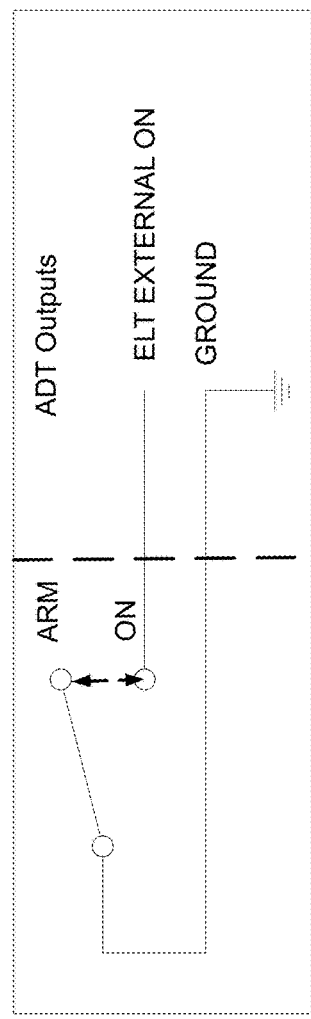
FIGS. 19A and 19B are diagrams showing respective ELT activation output configurations that support various possible ELT configurations.
Figure 19B:
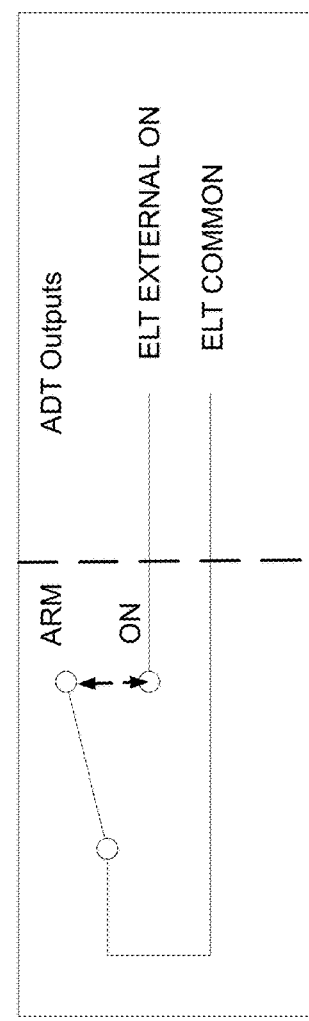
Figure 19C:
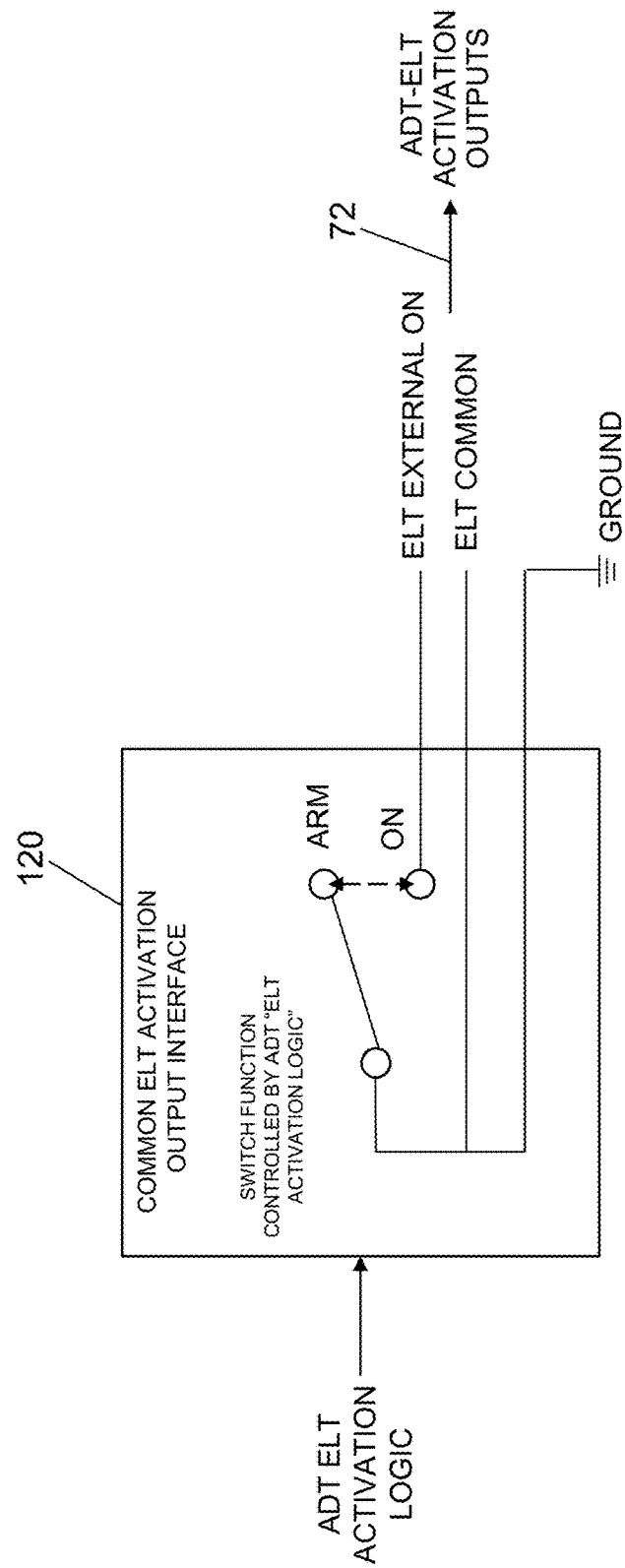
FIG. 19C is a diagram depicting a common ELT activation output interface function that allows ADT integration with ELT units having either of the activation configurations shown in FIGS. 19A and 19B.

For a given ELT type/installation configuration, the associated switch configurations shown in FIGS. 19A and 19B respectively can be inferred from the signal configurations seen on the common ELT crew activation input or would be entered as a configuration data entry (updateable over the air or via the maintenance port). Both switch configurations shown in FIGS. 19A and 19B use the ELT External ON Signal. If the ELT Common signal is not used for a given configuration, then this would not have to be connected. As seen in FIG. 19C, the common ELT activation output interface 120 comprises a configuration that emulates both of the remote switch configurations depicted in FIGS. 19A and 19B. The switch function is controlled by the ELT activation logic 110.

More specifically, the ADT unit pass-through function uses the output configuration that is equivalent to the received crew activation inputs. The ADT unit sets the pass-through function outputs to ARM by setting the ELT EXTERNAL ON signal to an open circuit with respect to ground and with respect to the ELT COMMON signal. The ADT unit sets the pass-through function output to ON by setting the ELT EXTERNAL ON signal to a closed circuit with respect to ground or with respect to the ELT COMMON signal following on the crew activation input configuration. When the ELT control panel switch is set to ARM, the ADT unit sets the pass-through function outputs to ARM within a short period of time (e.g., 0.1 second). When the ELT control panel switch is set to ON, the ADT unit sets the pass-through function outputs to ON within the same short period of time.

The common ELT activation output state map is implemented with default values and is updateable via ADT configuration file updates sent via a physical maintenance port update or over the air as a configuration update.

FIG. 20 shows electronic circuitry incorporated in the ADT unit and configured to perform the interfacing and other functions disclosed herein in accordance with some embodiments. This electronic circuitry includes the high-impedance buffer circuitry 134, an analog-to-digital converter 154 (e.g., a discrete-to-digital converter), a microcontroller 156, and a microprocessor 158, connected in series. The microprocessor 158 can be programmed to execute one or more of the interface sensor functions identified in FIGS. 17C, 18 and 19C. The electronic circuitry depicted in FIG. 20 may be common to the common aircraft discrete input interface 112, the common ELT crew activation input interface 116, and the common ELT activation input interface 118. In the alternative, the individual interfaces may incorporate the electronic circuitry depicted in FIG. 20.

Optionally, the buffer circuitry 134 may be incorporated in the analog-to-digital converter 154. The analog-to-digital converter 154 may be a separate integrated circuit or a built-in discrete input on the microcontroller 156. The analog-to-digital converter 154 converts the analog discrete inputs into digital inputs to the microcontroller 156. The microcontroller 156 aggregates various inputs and puts them on a digital bus for input to the microprocessor 158, where the logic would be implemented as a software function. Optionally, the microcontroller functionality may be in the microprocessor 158. Other software functions, such as the ELT activation logic 110 and the ADT trigger logic and aircraft behavior estimator 106, may be on the same microprocessor hardware platform as the above-described sensor functions 136, 138 and 140.

Furthermore, the common aircraft discrete output interface 114 and the common ELT activation output interface 120 may each comprise a variation of the electronic circuitry depicted in FIG. 20. The electronic circuitry in this case would include the same microcontroller 156 and microprocessor 158, but instead of an analog-to-digital converter 154 between the microcontroller 156 and the high-impedance buffer circuitry 134, the electronic circuitry would include any one of the following integrated circuits: a digital-to-analog converter, a digital-to-discrete converter, discrete switching or a discrete driver output. The microprocessor 158 would feed the microcontroller 156 to control the output discrete states via the common driver/out integrated circuit.

There are two major alternative smart switch-based embodiments for the discrete interface architecture shown in FIG. 20.

The first alternative smart switch-based embodiment for the functions in FIG. 20 is to use dedicated discrete-to-digital integrated circuits in combination with either input switching or dedicated input ports and wiring to bring inputs from different discrete types into the appropriate discrete-to-digital circuit interface in place of functions 134 and 154. This discrete-to-digital interface integrated circuit could be interconnected directly with the microprocessor 158 hosting the associated software function or to the microprocessor via a microcontroller 156 providing digital data combination, translation and queuing-to-a-digital-bus functions.

The second alternative smart switch-based embodiment would be to use the analog-to-digital converter 154 with its broad capabilities to sense and interpret the input signal values. This analog-to-digital converter 154 would be interconnected directly with an microprocessor 158 hosting the associated software function or to the microprocessor 158 via a microcontroller 156 providing digital data combination, translation and queuing-to-a-digital-bus functions. In this case an additional function in software hosted in the microprocessor or as firmware in an interface circuit (for example, a field programmable gate array or a programmable logic device) would be added that would determine the discrete type connected and interpret the inputs received for the logic functions in the microprocessor software.

Both alternatives could lead to single part number device that could work across a very broad and disparate fleet of airplane configurations. A smart switch-based architecture could also be leveraged to detect tampering or system failures.

Figure 21:
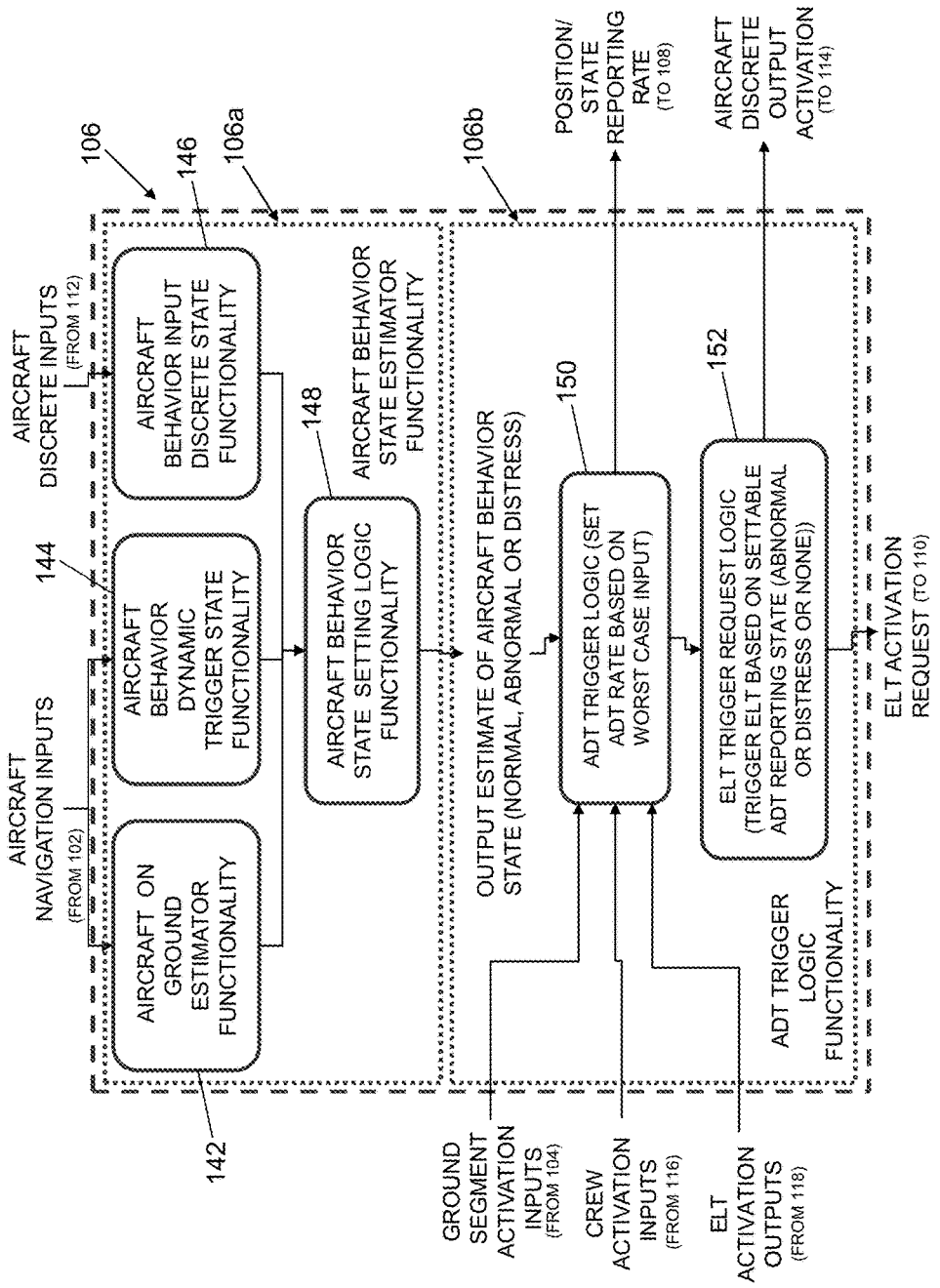
FIG. 21 is a diagram identifying components of the ADT trigger logic and aircraft behavior state estimator in accordance with one embodiment of the ADT unit.

FIG. 21 is a diagram identifying components of the ADT trigger logic and aircraft behavior state estimator 106 in accordance with one embodiment of the ADT unit 40. The ADT processor 88 (see FIG. 5) uses an autonomous algorithm, referred to herein as the aircraft behavior state estimator 106a, to internally generate triggers for alerts and distress calls. This is the logic that allows early detection of an aircraft in distress and hence the early triggering and longer duration broadcasts that provide improved emergency detection benefits. The aircraft behavior state estimator 106a comprises an aircraft-on-ground estimator 142 and aircraft behavior dynamic trigger state functionality 144, both of which receive aircraft navigation inputs from the ADT position and attitude data function 102 (see FIG. 14).

The ADT unit has internal sensors to determine aircraft position, trajectory and attitude information in conjunction with GNSS or input aircraft navigation data The aircraft behavior state estimator 106a depicted in FIG. 21 further comprises aircraft behavior input discrete state functionality 146, which receives aircraft discrete inputs from the aircraft avionics system 28 by way of the common aircraft discrete input interface 112 (see FIG. 14).

FIG. 21 shows the logic flow for the aircraft behavior state estimator 106a. The aircraft behavior estimate is based on the integration of several components or aspects of the observed aircraft state: the on-ground or airborne estimate, abnormal rates or attitudes for a given location as determined by dynamic trigger conditions, and the state of aircraft discrete inputs from the aircraft avionics systems. The on-ground or airborne state of the aircraft is estimated by the aircraft-on-ground estimator 142; the abnormal rates or attitudes are determined by the aircraft behavior dynamic trigger state functionality 144; and the state of aircraft discrete inputs is determined by the aircraft behavior input discrete state functionality 146. The results are input to the aircraft behavior state setting logic functionality 148, which outputs signals indicating the estimated state of the aircraft. The possible states include: normal, abnormal and distress (or pre-crash) behavior. The aircraft behavior state estimator 106a also outputs whether the aircraft is airborne or on-the-ground (landed).

The aircraft-on-ground estimator 142 uses aircraft speed and altitude to estimate whether the aircraft is on the ground (e.g., landed) or in the air. The aircraft behavior state setting logic 148 is configured to suppress the dynamic trigger conditions (from aircraft behavior dynamic trigger state functionality 144) and aircraft discrete inputs (from aircraft behavior input discrete state functionality 146) for setting aircraft behavior estimate abnormal or distress states if the output from aircraft-on-ground estimator 142 indicates that the aircraft is on the ground. The aircraft behavior state setting logic 148 is also configured to output a signal indicating that the estimated aircraft behavior state is abnormal or distress depending on the state of aircraft discrete inputs output by the aircraft behavior input discrete state functionality 146. The aircraft behavior state setting logic 148 is further configured to output a signal indicating that the estimated aircraft behavior state is abnormal or distress depending on whether the aircraft behavior dynamic trigger state functionality 144 has detected an abnormal attitude, speed or altitude.

The aircraft behavior dynamic trigger state functionality 144 uses logic that compares sensor data to trigger conditions that may indicate an abnormal or distress state, such as unusual attitude (e.g., excessive bank or pitch), unusual speed (e.g., horizontal speed outside a range or excessive vertical speed), an unusual altitude (e.g., an altitude outside of an expected range, and an unusual maneuver (e.g., an excessive track change). Tables setting forth trigger conditions in accordance with one configuration can be found in FIGS. 11 through 15 in U.S. patent application Ser. No. 14/858,235, the disclosure of which is incorporated by reference herein in its entirety. Other tables to set normal, abnormal or distress state conditions while the aircraft is in an airborne state can be used. Geofences, or geographic boundaries, may be defined to define oceanic or remote versus continental or non-remote airspace where greater radar and surveillance coverage will be available to help locate an aircraft in distress. For example, the geofences may provide different minimum and maximum altitude thresholds for oceanic or en route flight phases and for flight phases occurring closer to the origination and destination locations.

The aircraft behavior state setting logic 148 has state settings of NORMAL, ABNORMAL and DISTRESS. The logic for setting these states is as follows:

(a) The ADT unit sets the aircraft behavior state to NORMAL when the aircraft is on the ground.

(b) When the aircraft is airborne, the ADT unit sets the aircraft behavior state to the highest values specified by:

(1) an aircraft behavior dynamic trigger state setting determined by the aircraft behavior dynamic trigger state logic 144 (the aircraft behavior state is set to the highest values specified by trigger condition logic of the types indicated in FIGS. 11-15 of U.S. patent application Ser. No. 14/858,235);

(2) a minimum/maximum safe altitude state setting as determined by maximum/minimum safe altitude logic;

(3) an aircraft behavior power state setting as determined by aircraft behavior power state transitions logic;

(4) an aircraft behavior ELT state setting as determined by aircraft behavior ELT state transitions logic;

(5) an aircraft discrete input state setting as determined by aircraft behavior discrete input state transitions logic; and.

(6) treat any BEHAVIOR INDETERMINATE setting inputs as ABNORMAL state settings and report the presence of BEHAVIOR INDETERMINATE settings.

The ADT unit uses the following reporting rate hierarchy for determining the relative values of the requested Airborne Behavior State: DISTRESS>ABNORMAL>NORMAL (i.e., DISTRESS is the highest aircraft behavior state, NORMAL is the lowest.)

Still referring to FIG. 21, the aircraft behavior state estimator 106a outputs its estimate of the aircraft behavior state (normal, abnormal or distress) to the ADT trigger logic 106b. The ADT trigger logic 106b comprises ADT trigger logic 150 and ELT activation request logic 152. The ADT trigger logic 150 first determines the transmit state (whether the ADT unit is allowed to transmit or not) currently active. Then, if the Transmit-ON state is active (i.e., transmissions are allowed), the ADT trigger logic 150 determines the appropriate position/state report transmit rate based on a worst case input. The ADT trigger logic 150 determines the current transmit state (Transmit ON or Transmit OFF) using flight crew activation inputs received from the common ELT crew activation input interface 116 (see FIG. 14), ground segment command inputs received from the ADT ground data link function 104 (see FIG. 14), and ELT activation inputs received from the common ELT activation input interface 118 (see FIG. 14). Based on these inputs, the ADT trigger logic 150 outputs the position/state reporting rate to the ADT position/state reporting function 108 (see FIG. 14).

Referring again to FIG. 21, the ADT trigger logic 150 also outputs the aircraft behavior state to the ELT activation request logic 152, which is configured to trigger the ELT unit based on a settable ADT reporting state (Abnormal or Distress or None). The ELT activation request logic 152 outputs the ELT activation request to the ELT activation logic 110 (see FIG. 14). The ELT activation request logic 152 also outputs a discrete indicating ELT activation to the common aircraft discrete output interface 114 (see FIG. 14).

If the ADT trigger logic and aircraft behavior state estimator 106 detects a distress condition, then an ELT activation signal is sent to the ELT activation logic 110 and an aircraft discrete output is sent to the aircraft avionics systems 28 by way of the common aircraft discrete input interface 114 (see FIG. 14). If the ADT trigger logic and aircraft behavior state estimator 106 detects an abnormal condition, then an ELT activation signal may be sent to the ELT activation logic 110 depending on whether abnormal states are configured to activate the ELT. An alternate implementation is to require the abnormal condition to be active for a longer time before the ELT is activated. This abnormal state estimate provides estimates that are not as indicative of a true distress condition but are indicative of abnormal conditions. These abnormal conditions may result in more false positive ELT activations, but may also result in earlier activations in the case of an aircraft in distress. Thus it is envisioned as a configurable state that can be updated based on operational experience.

Figure 22:
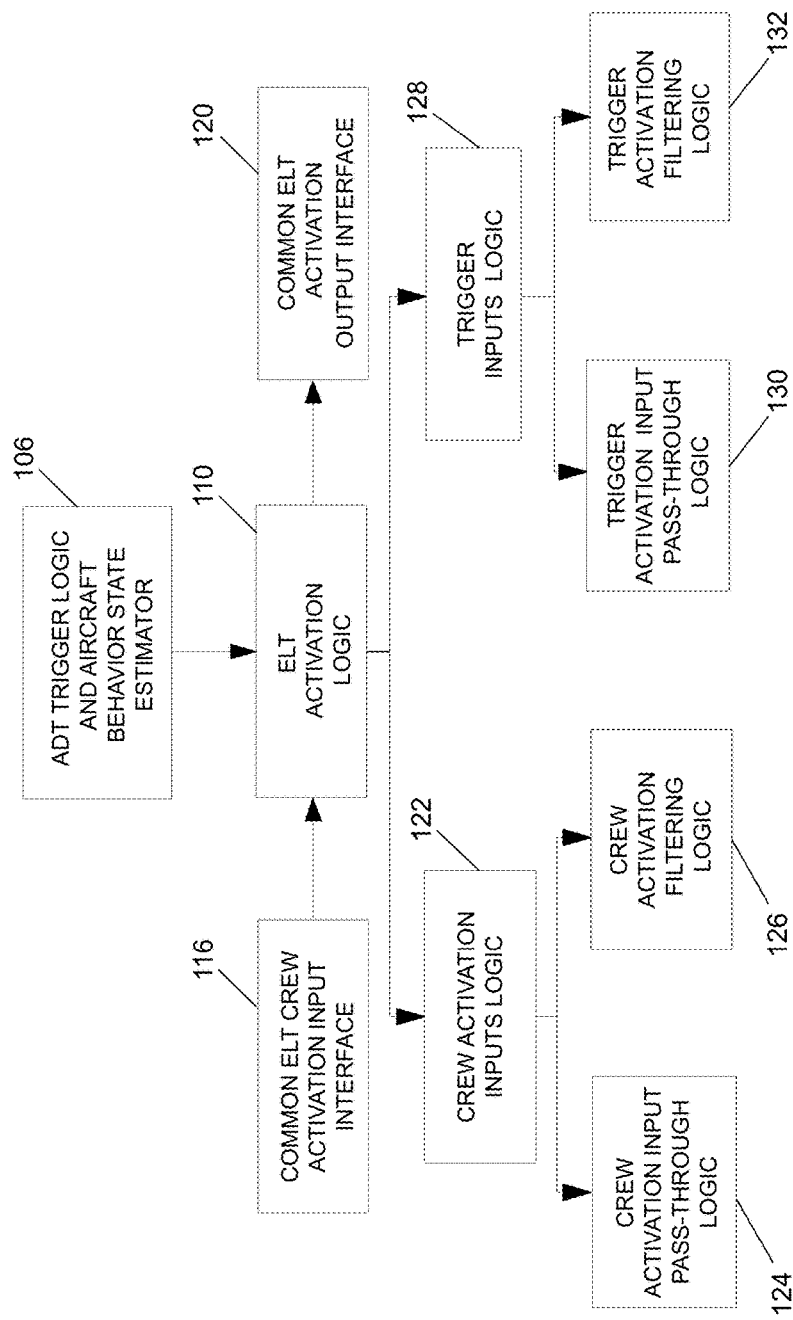
FIG. 22 is a block diagram identifying components of an ELT activation logic function for an ADT unit.

For the tightly coupled (see FIG. 11) and medium coupled (see FIG. 12) ADT-ELT configurations, the ELT activation logic 110 provides the critical bridge between the incoming ELT crew activation inputs, the ADT trigger logic and aircraft behavior state estimator 106 and the output ELT activation signals that provide the external activation commands to the ELTs. The basic components of the ELT activation logic 110 are shown in FIG. 22.

At the top level the ELT activation logic 110 may comprise two separate software modules: crew activation inputs logic 122 and trigger inputs logic 128, respectively corresponding to the two potential sources of ELT activation inputs: the flight crew activation inputs coming in via the common ELT crew activation input interface 116 and the ADT activation inputs coming in via the ADT trigger logic and aircraft behavior state estimator 106 (which inputs include aircraft discrete inputs from the avionics system 28 and ground segment-uplinked activation commands received via SATCOM).

The crew activation inputs logic 122 in turn comprises two components (e.g., computer routines for executing respective algorithms): crew activation input pass-through logic 124 and crew activation filtering logic 126. The basic crew activation input pass-through logic 124 is designed to apply the current crew activation input state (e.g., ELT ON or ELT ARM) to the common ELT activation output interface 120 within a short period of time (on the order of 0.1 second), subject to the crew activation filtering logic 126. The basic crew activation filtering logic 126 is designed to allow all crew activations to pass through to the common ELT activation output interface 120 while the aircraft is airborne and while there is no countermanding ground segment command. Other flight crew activation filters can be applied and this function is implemented with default values and is updateable via ADT configuration file updates sent via a physical maintenance port update or over the air as a configuration update.

Similarly, the trigger inputs logic 128 in turn comprises two components (e.g., computer routines for executing respective algorithms): the trigger activation input pass-through logic 130 and the trigger activation filtering logic 132. The basic trigger activation input pass-through logic 130 is designed to apply any aircraft behavior state of distress as an ELT ON state and any other states as maintaining ELT ARM to the common ELT activation output interface 120 within a short period of time (on the order of 0.1 second), subject to the trigger activation filtering logic 132. The basic trigger activation filtering logic 132 is designed to allow all ELT activations to pass through to the common ELT activation output interface 120 while the aircraft is airborne and while there is no countermanding ground segment command. Other trigger activation filters can be applied and this function is implemented with default values and is updateable via ADT configuration file updates sent via a physical maintenance port update or over the air as a configuration update.

For conflicting or differing flight crew and trigger input values, the highest priority goes to the input with the greatest severity level, i.e., an input of ELT ON supersedes an input of ELT ARM.

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The structure corresponding to the "processing means" recited in the claims comprises one or more processors (e.g., microprocessors) and software modules comprising logic executable by the processor(s). One processor (or each of two or more processors) may execute logic from more than one software module. Alternatively, the respective logic of a multiplicity of software modules can be executed by a respective multiplicity of processors. In claims that recite "first processing means" and "second processing means", the respective corresponding structures for performing the processing function include at least the following configurations: (1) first and second software modules (of the first and second processing means respectively) which have their logic executed by the same processor; and (2) first and second software modules which have their logic executed by first and second processors respectively.

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. An ADT unit comprising:
first processing means comprising ELT activation logic; and
an input interface comprising first, second and third terminals and second processing means configured to output an ELT ON state signal to the ELT activation logic if an impedance between the first and third terminals is effectively zero or if an impedance between the first and second terminals is effectively zero.

2. The ADT unit as recited in claim 1, wherein the first and second processing means comprise a common processor.

3. The ADT unit as recited in claim 1, wherein the first processing means comprise a first processor and the second processing means comprises a second processor.

4. The ADT unit as recited in claim 1, wherein the input interface further comprises a high-impedance buffer circuit connected to the first, second and third terminals.

5. The ADT unit as recited in claim 4, wherein the input interface further comprises an analog-to-digital converter between the high-impedance buffer circuit and the second processing means.

6. The ADT unit as recited in claim 1, wherein the first processing means further comprises an aircraft behavior state estimator and ADT trigger logic that receives an estimated aircraft behavior state signal from the aircraft behavior state estimator and the ELT ON state signal from the second processing means, and is configured to send an ELT activation request signal to the ELT activation logic if the estimated aircraft behavior state signal indicates an abnormal or distress state or an ELT ON state signal has been received.

7. A system onboard an aircraft comprising:
an ELT remote panel on the flight deck of the aircraft, the ELT remote panel comprising a switch;
a first antenna that is attached to an exterior of a fuselage skin of the aircraft; and
an ADT unit connected to the first antenna and comprising:
first processing means comprising ELT activation logic; and
a first input interface comprising first, second and third terminals, and second processing means configured to output an ELT ON state signal to the ELT activation logic if an impedance between the first and third terminals is effectively zero or if an impedance between the first and second terminals is effectively zero,
wherein the switch of the ELT remote panel is connected to the first terminal of the first input interface by wiring.

8. The system as recited in claim 7, wherein the first and second processing means comprise a common processor.

9. The system as recited in claim 7, wherein the first processing means comprise a first processor and the second processing means comprises a second processor.

10. The system as recited in claim 7, wherein the switch of the ELT remote panel is not connected to either of the second and third terminals of the first input interface and the third terminal of the first input interface is connected to ground.

11. The system as recited in claim 7, wherein the switch of the ELT remote panel is also connected to the second terminal of the first input interface by wiring.

12. The system as recited in claim 7, wherein the first input interface of the ADT unit further comprises:
a high-impedance buffer circuit connected to the first, second and third terminals; and
an analog-to-digital converter between the high-impedance buffer circuit and the second processing means.

13. The system as recited in claim 7, further comprising:
a second antenna that is attached to an exterior of a fuselage skin of the aircraft; and
an ELT unit connected to the second antenna and to the ADT unit.

14. The system as recited in claim 13, wherein the ELT unit is also connected to the switch of the ELT remote panel.

15. The system as recited in claim 13, wherein the ADT unit further comprises a first output interface that comprises a terminal connected to the ELT unit and third processing means configured to output an ELT ON state signal to the terminal of the first output interface in response to receipt of an ELT ON state signal from the ELT activation logic.

16. The system as recited in claim 15, wherein the ELT activation logic comprises trigger activation filtering logic and trigger activation input pass-through logic configured to apply the ELT ON state signal to the terminal of the first output interface subject to the trigger activation filtering logic.

17. The system as recited in claim 13, wherein the first processing means further comprises an aircraft behavior state estimator and trigger logic that receives an estimated aircraft behavior state signal from the aircraft behavior state estimator and the ELT ON state signal from the second processing means, the trigger logic being configured to send an ELT activation request signal to the ELT activation logic if the estimated aircraft behavior state signal indicates an abnormal or distress state or an ELT ON state signal has been received.

18. The system as recited in claim 17, wherein the ELT activation logic comprises crew activation filtering logic and crew activation input pass-through logic configured to apply the ELT ON state signal from the second processing means to the terminal of the first output interface subject to the crew activation filtering logic.

19. The system as recited in claim 13, further comprising an aircraft avionics system, wherein the ADT unit further comprises a second input interface and a second output interface connected to the aircraft avionics system by wiring.

* * * * *